United States Patent [19]
Postrel et al.

[11] Patent Number: 6,003,008
[45] Date of Patent: Dec. 14, 1999

[54] POINT OF SALE DEVICE

[75] Inventors: Richard D. Postrel, Miami Beach, Fla.; Kenneth R. Haven, Fremont, Calif.; Edward H. Empson, San Jose, Calif.; Chih C. Fang, Fremont, Calif.; Hazem Nabulsi, Los Altos, Calif.; Steven J. Shiozaki, Belmont, Calif.; James G. O'Young, Sunnyvale, Calif.

[73] Assignee: SkyTeller L.L.C., Englewood, Colo.

[21] Appl. No.: 09/045,399

[22] Filed: Mar. 20, 1998

[51] Int. Cl.⁶ .................................................. G06F 17/60
[52] U.S. Cl. .............................. 705/4; 235/381; 705/161
[58] Field of Search ........................... 705/4, 16; 235/381

[56] References Cited

U.S. PATENT DOCUMENTS

| | | |
|---|---|---|
| D. 334,567 | 4/1993 | Someya et al. . |
| D. 348,896 | 7/1994 | Kumar et al. . |
| D. 360,196 | 7/1995 | Cox et al. . |
| D. 389,813 | 1/1998 | Itoh . |
| 3,945,316 | 3/1976 | Thomson et al. . |
| 4,092,524 | 5/1978 | Moreno . |
| 4,102,493 | 7/1978 | Moreno . |
| 4,251,867 | 2/1981 | Uchida et al. . |
| 4,277,837 | 7/1981 | Stuckert . |
| 4,310,885 | 1/1982 | Azcua et al. . |
| 4,404,464 | 9/1983 | Moreno . |
| 4,436,182 | 3/1984 | Simonotti et al. . |
| 4,441,160 | 4/1984 | Azcua et al. . |
| 4,578,009 | 3/1986 | Granzow et al. . |
| 4,585,145 | 4/1986 | Pitroda . |
| 4,669,393 | 6/1987 | Wührich . |
| 4,722,054 | 1/1988 | Yorozu et al. . |
| 4,808,801 | 2/1989 | Nakagawa . |
| 4,890,824 | 1/1990 | Uchida et al. . |
| 4,903,200 | 2/1990 | Mook, Jr. . |
| 4,953,086 | 8/1990 | Fakatsu . |
| 4,972,496 | 11/1990 | Sklarew . |
| 4,977,994 | 12/1990 | Adachi et al. . |
| 5,003,520 | 3/1991 | Grieu et al. . |

(List continued on next page.)

FOREIGN PATENT DOCUMENTS

| | | |
|---|---|---|
| 2163396 | 5/1996 | Canada . |
| 2185519 | 3/1997 | Canada . |
| 0182137 | 5/1986 | European Pat. Off. . |

(List continued on next page.)

OTHER PUBLICATIONS

Press release and brochuer, In–Flight Financial Services, Ltd., Feb., 1998 (3 pages).

Inflight financial Services, Ltd., Press Release, "IFS introduces the world's first inflight currency exchange system", Feb. 1998 (4 p.).

*Primary Examiner*—Harold I. Pitts
*Attorney, Agent, or Firm*—Sidley & Austin

[57] ABSTRACT

A point of sale device (20) is provided comprising a base unit (22) and a cover unit (34) connected to one another by a hinge mechanism (38). The base unit has a front surface (24) and an exterior casing (25) which define an interior volume. Transaction appliances, for example, a card reader (26), receivables storage drawer (28), a currency storage drawer (30), and a bar code scanner (32), are mounted in the interior volume and accessible from the front surface of the base unit. The cover unit includes a display screen (36) mounted on one side. The cover unit can be moved between a closed configuration and an open configuration. In the closed configuration, the cover unit is positioned with the display screen facing and directly in front of the front surface of the base unit such that the display screen is not visible and access to the transaction appliances in the base unit is blocked by the cover unit. In the open configuration, the user can access the display screen and the transaction appliances. A control unit (40) and input unit are provided to facilitate communications between the user and the POS device to facilitate the performance of desired transactions. The device can operate on internal batteries (64) to allow portable operation.

92 Claims, 9 Drawing Sheets

U.S. PATENT DOCUMENTS

| | | |
|---|---|---|
| 5,031,098 | 7/1991 | Miller et al. . |
| 5,057,676 | 10/1991 | Komaki . |
| 5,057,677 | 10/1991 | Bertagna et al. . |
| 5,149,945 | 9/1992 | Johnson et al. . |
| 5,173,590 | 12/1992 | Nakano et al. . |
| 5,233,167 | 8/1993 | Markman et al. . |
| 5,237,487 | 8/1993 | Dittmer et al. . |
| 5,253,345 | 10/1993 | Fernandes et al. . |
| 5,258,908 | 11/1993 | Hartheimer et al. . |
| 5,294,782 | 3/1994 | Kumar . |
| 5,334,821 | 8/1994 | Campo et al. . |
| 5,338,923 | 8/1994 | Grieu . |
| 5,386,106 | 1/1995 | Kumar . |
| 5,396,417 | 3/1995 | Burks et al. . |
| 5,408,077 | 4/1995 | Campo et al. . |
| 5,408,078 | 4/1995 | Campo et al. . |
| 5,489,773 | 2/1996 | Kumar . |
| 5,500,513 | 3/1996 | Langhans et al. . |
| 5,508,913 | 4/1996 | Yamamoto et al. . |
| 5,541,925 | 7/1996 | Pittenger et al. . |
| 5,613,159 | 3/1997 | Colnot . |
| 5,670,768 | 9/1997 | Modiano et al. . |
| 5,845,256 | 12/1998 | Pescitelli et al. ............................ 705/4 |

FOREIGN PATENT DOCUMENTS

| | | |
|---|---|---|
| 0566512 | 10/1993 | European Pat. Off. . |
| 0566514 | 10/1993 | European Pat. Off. . |
| 0660280 | 6/1995 | European Pat. Off. . |
| 0768626 | 4/1997 | European Pat. Off. . |
| 2653948 | 5/1991 | France . |
| 2679679 | 1/1993 | France . |
| 2690768 | 5/1993 | France . |
| 2697929 | 5/1994 | France . |
| 2710769 | 4/1995 | France . |
| 3410381 | 9/1984 | Germany . |
| 3616748 | 11/1987 | Germany . |
| 2205428 | 12/1988 | United Kingdom . |
| 2275796 | 9/1994 | United Kingdom . |
| 2277177 | 10/1994 | United Kingdom . |
| 2277178 | 10/1994 | United Kingdom . |
| 90/01199 | 2/1990 | WIPO . |
| 92/02903 | 2/1992 | WIPO . |
| 95/03595 | 2/1995 | WIPO . |
| 95/23390 | 8/1995 | WIPO . |
| 97/04426 | 2/1997 | WIPO . |

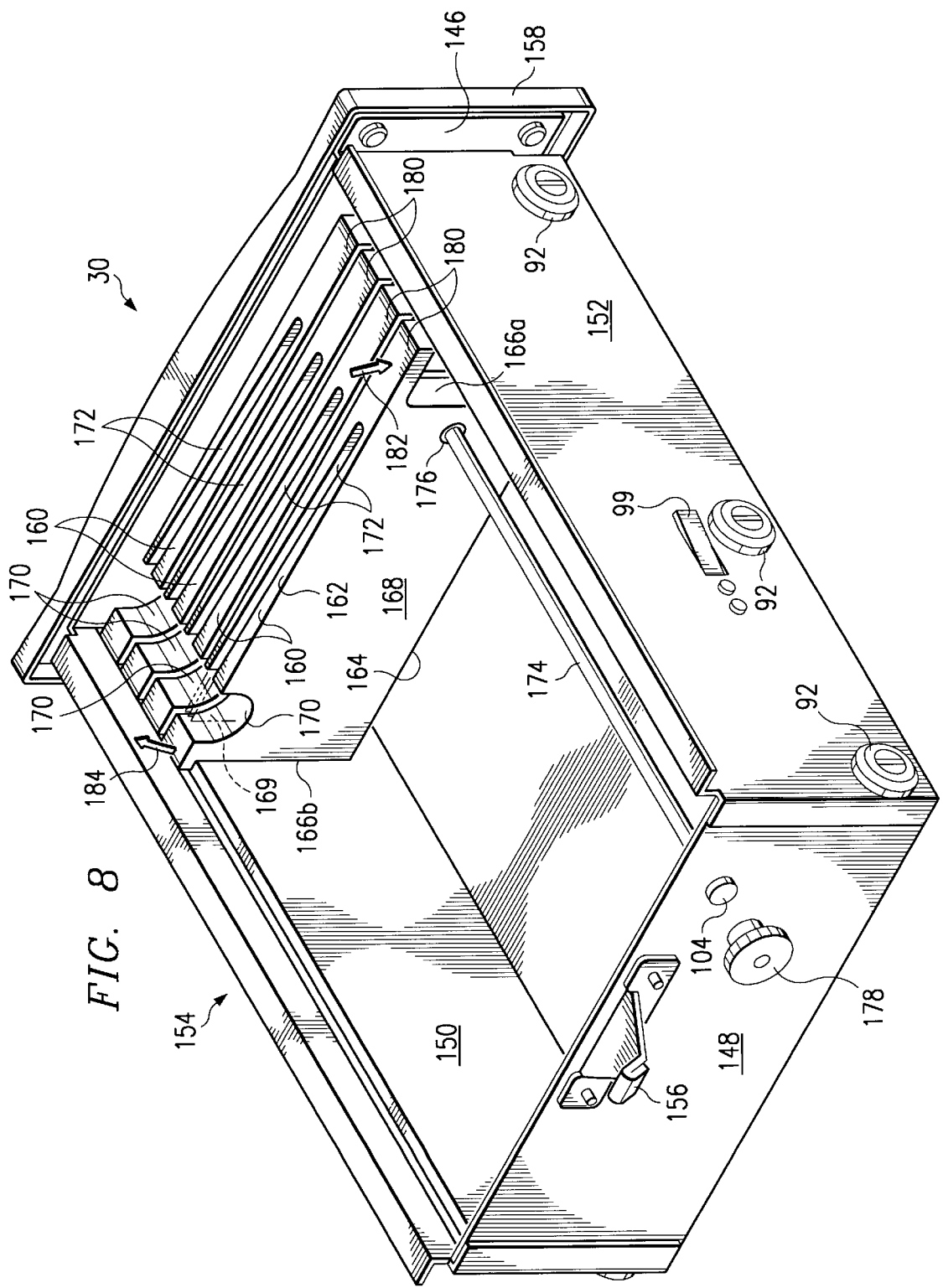

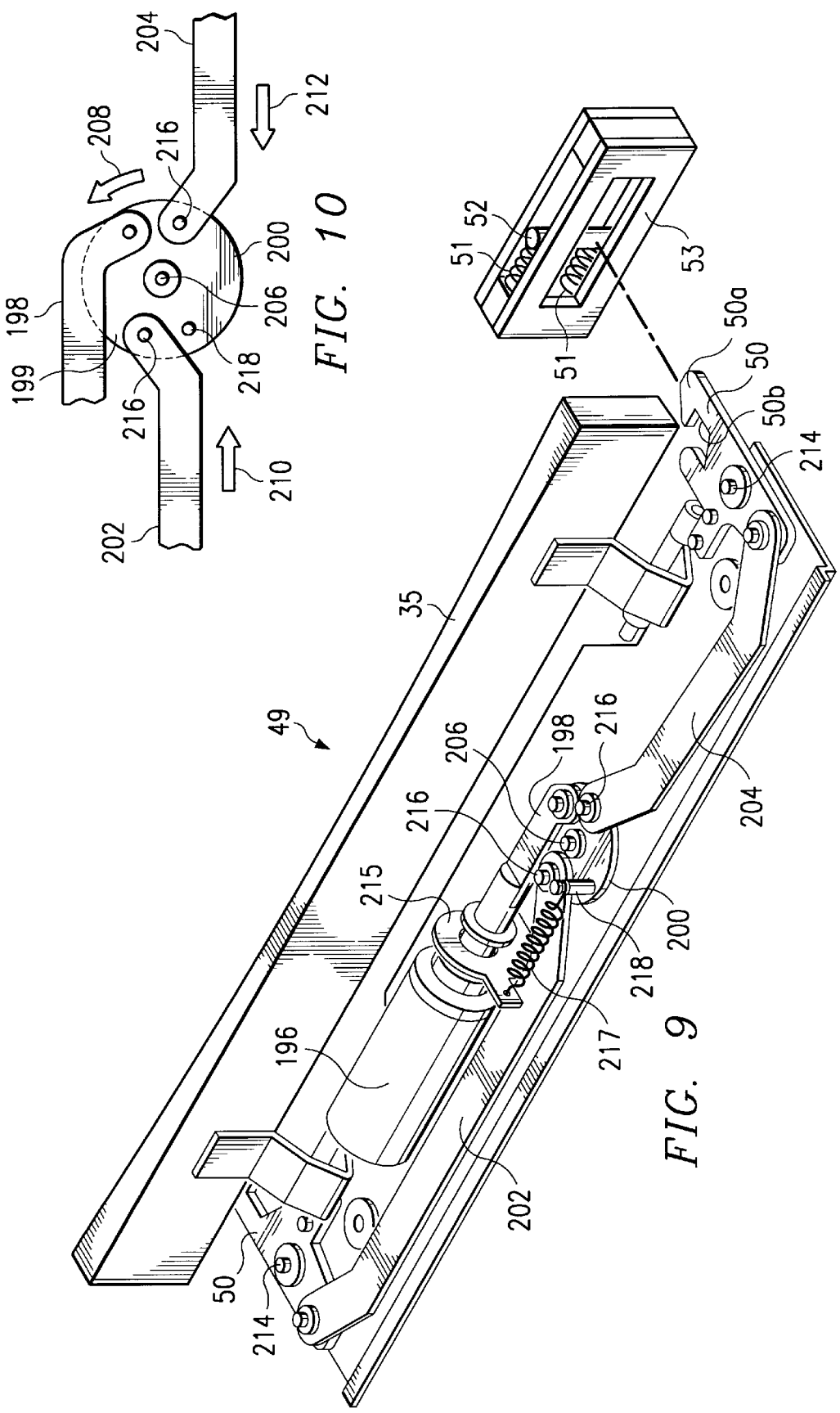

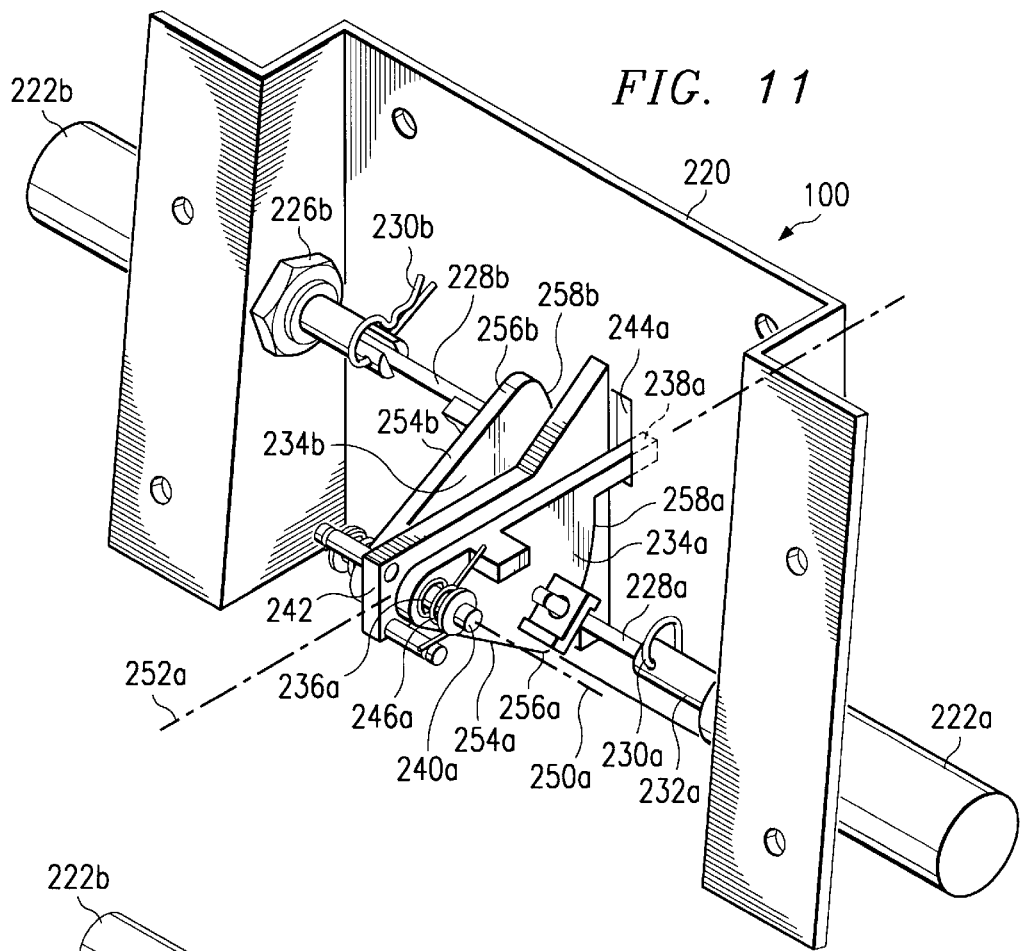
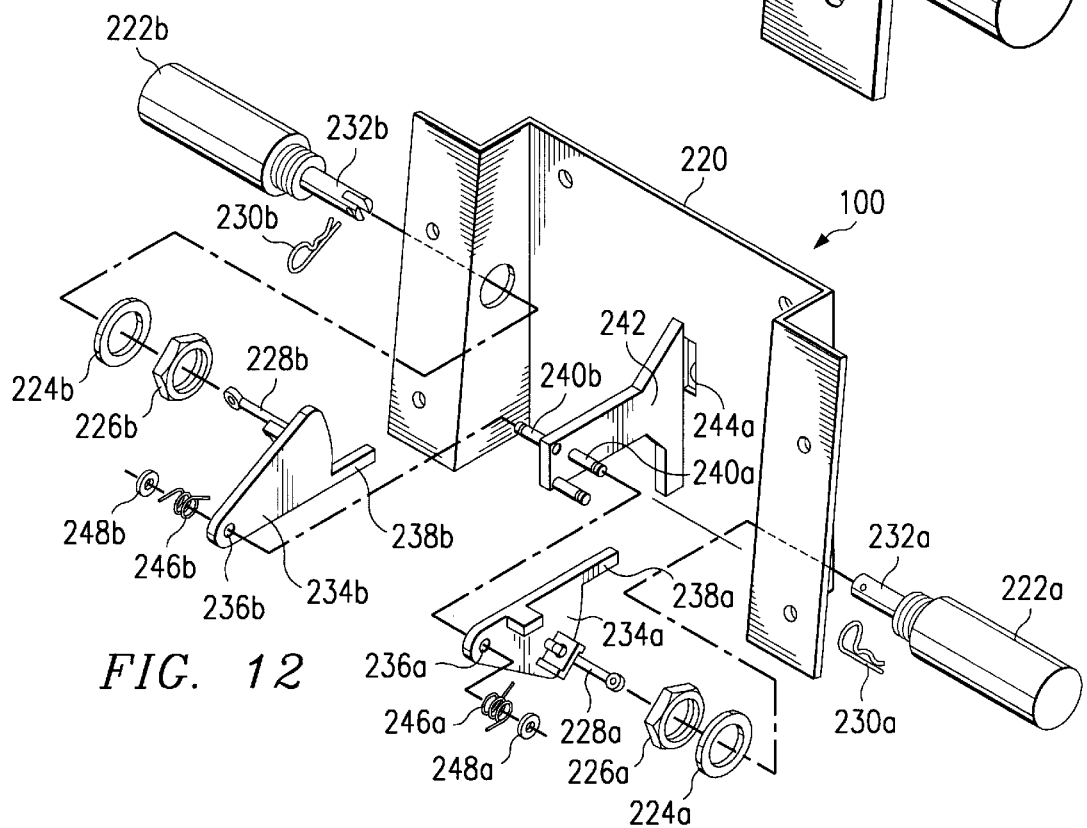

POINT OF SALE DEVICE

BACKGROUND OF THE INVENTION

A point of sale device, as used in this application is a device for performing, recording, or otherwise facilitating transactions associated with the on-site sale or transfer of goods or services. The current invention relates particularly, although not exclusively, to a point of sale device adapted for use onboard transportation means, for example aircraft, ships, trains, ferries, buses, etc.

Many transportation providers seek to offer their passengers a higher class of service by providing desired services en route. These services can include currency exchange services and the sale of liquor, food, and destination-related items (e.g., maps, event tickets). In addition, most international flights and ship passages now offer sales of duty-free items (e.g., liquor, perfume, watches) to passengers inflight or en route.

Conventionally, the services just described are performed manually by the attendants or crew of the vehicle. For example, money for liquor sales or duty-free sales may be collected by an airline flight attendant who makes change from money in a small pouch or even from a pocket in the clothing. Credit card transactions may require a customer to relinquish the card to an attendant who takes the card to another part of the vehicle for processing. These manual transactions are time-consuming, error prone, and often times do not provide a desirable professional image for the service provider. In addition, duty-free sales are governed by Customs' rules and regulations which make it essential to maintain proper inventory and sales records of duty-free items.

Many attempts have been made to provide a point of sale device to facilitate the service transactions associated with onboard sales. A point of sale device for use on transportation means must, however, be adapted to address certain circumstances characteristic to the onboard environment. These circumstances include the relative immobility of the passengers (i.e., potential customers), limited space for movement and storage, and the prevalence of multi-currency transactions, especially during international travel.

To a great extent on aircraft, and to a somewhat lesser extent on other forms of transportation, the passengers are largely confined to their assigned seats or areas. Therefore, it is advantageous for the point of sale device to be portable so that it can be transported through the vehicle cabin by an attendant rather than requiring the passengers to travel to a certain part of the vehicle in order to use the device. In addition, since electrical power may not be conveniently available at every point in the onboard environment, it is desirable that the point of sale device include a self-contained power supply. A need therefore exists for a point of sale device which can be easily moved through a vehicle cabin and which has a self-contained power supply.

The crowded conditions typically encountered in the onboard environment raise security issues in connection with the use of a point of sale device. For example, if the point of sale device stores currency or other valuable objects, it is an unfortunate fact that some passengers may take the opportunity to pilfer the point of sale device when the attendant is not looking, for example while engaged in another transaction or other cabin duties. The security of currency or other valuables is also of concern if the point of sale device is unattended or in storage on the vehicle, such as during the takeoff and landing of a commercial aircraft. A need therefore exists, for a point of sale device which can securely store currency and other valuable objects so as to permit ready access by authorized persons while, at the same time, discouraging any pilferage or theft of the contents by unauthorized persons.

On all forms of transportation, and especially on international transportation, passengers are increasingly likely to request multi-currency transactions. For example, a customer may wish to purchase a product or service which is denominated in one currency by paying with one or more different currencies. In other cases, passengers may wish to exchange their existing currency for a different currency such as the currency of their destination. In both cases, completing the transaction will require the ability to quickly determine the appropriate exchange rate between the currencies involved, calculate the amounts of each currency which are involved, securely store the currencies received from the customer, and efficiently dispense the currencies which have been purchased (if a currency exchange transaction) or the change due (if a sales transaction). Further, it is becoming increasingly common for customers to conduct portions of the transaction using a credit card or smart card, for example, purchasing duty-free items or currency exchange using a credit card or smart card. In such cases, it is necessary to collect and process credit card or smart card information and to record the transaction such that appropriate billing can be arranged. A need therefore exists, for a point of sale device which can perform currency exchange calculations, securely store currencies received from customers, and efficiently dispense currencies of other countries or denominations to the customers. A need also exists for a point of sale device which can process and record credit card and smart card transactions.

When transactions relate to the sale of duty-free goods on board an aircraft or ship, Customs' regulations typically require full and detailed records to be maintained regarding the stock of goods held on the vehicle, the extent of sales made during a flight, and any additions to stock made during stopovers. This accounting of duty-free items can be further complicated by the vehicle calling at several airports or ports of call during a trip, or experiencing changes in the crew responsible for duty-free sales between Customs' reports. Crew members responsible for duty-free sales must often spend significant time in preparing Customs' reports detailing the changes to inventory in the duty-free goods and reconciling any discrepancies which appear in the records. A need therefore exists, for a point of sale device which can maintain an inventory of the duty-free goods on board a vehicle, adjust the inventory to reflect duty-free sales transactions which have occurred, and to prepare on demand a Customs' report providing the required Customs' information in the formats required by a specific country.

Since customers may change their mind during a transaction, after a transaction, or even after subsequent transactions have been performed, it is also advantageous for a point of sale device to have the capacity of nullifying or reversing a previous transaction. This can involve facilitating a variety of actions, for example, receiving back a previously dispensed currency, refunding a previously received currency, reversing a credit card or smart card transaction, and adjusting the appropriate inventories, databases, Customs' records and the like to reflect the updated circumstances. A need therefore exists, for a point of sale device which can facilitate the reversal of any previous transaction, including the return of previously dispensed currencies to secure storage.

Numerous prior art devices have attempted to provide a point of sale device adapted for onboard use. For example, U.S. Pat. No. 5,670,768 discloses a vehicle mounted cash dispensing machine suitable for use on transportation facilities. International Publication No. WO 95/23390 discloses a system for performing and recording transactions in connection with vending of articles onboard transportation means. International Publication No. WO 95/03595 discloses a hand-held point of sale system for controlling, selling and replenishing of duty-free items onboard commercial aircraft. International Publication No. WO 90/01199 discloses a transaction recording apparatus for use in duty-free sales and other transactions on an aircraft. U.K. Patent Application No. GB 2,205,428 discloses a stock and cash control system particularly suitable for in flight sales to air passengers.

Each of the above-referenced prior art documents discloses a device or system relating to point of sale transactions aboard transportation means. None, however, effectively addresses all of the problems present in the onboard environment. For example, while some of these devices can assist in the management of information relating to duty-free sales, they have no provision for the secure storage of receivables or currency. Other devices include provisions for currency storage, but have no provisions for duty-free sales management. And few, if any, of the disclosed devices can facilitate the reversal of a previous transaction including the return of dispensed currency to secure storage.

SUMMARY OF THE INVENTION

A point of sale device is provided which can be used for many point of sale applications, but which is particularly suited for use on international aircraft flights and other transportation means. The point of sale device includes a base unit, a cover unit, a control unit, and an input unit. The base unit has a front surface and at least one transaction appliance (i.e., an apparatus for facilitating a transaction) which is accessible from the front surface. The cover unit has a display screen and is connected to the base unit by a hinge mechanism interposed between the base unit and the cover unit such that the cover unit can be moved between a closed configuration, in which the cover unit is positioned with the display screen facing the front surface of the base unit such that the screen is not visible and access to at least one transaction appliance is blocked by the cover unit, and an open configuration, in which the cover unit is positioned to allow access to the transaction appliance and the display screen is visible. The control unit is located in either the base unit or the cover unit and controls the display screen and various operational states of the device. The input unit is located on either the base unit or the cover unit for supplying input signals to the control unit.

In another embodiment, the point of sale device can be powered entirely by internal batteries. In yet another embodiment, the device can also be powered by external electric power supplied through an electrical connector port. In a still further embodiment, the device can comprise a printer assembly for printing receipts and transaction reports.

In additional embodiments, various display screen parameters, input devices, and locking mechanism configurations are provided.

In another embodiment, one of the transaction appliances in the base unit is a card reader capable of reading magnetic strips on credit cards and smart cards. In yet another embodiment, the transaction appliance is an optical bar code scanner. In a further embodiment, one of the transaction appliances is a receivables drawer having a first compartment with a one-way lid allowing manual insertion of laminar objects, a second compartment having a partial lid for allowing manual insertion and manual withdrawal of transaction-related objects, and a third compartment for storing and manually dispensing coins and other small objects. In yet another embodiment, one of the transaction appliances is a currency drawer comprising a plurality of dispenser units for storing and manually dispensing currency of various denominations and other laminar objects.

In additional embodiments, the hinge mechanism comprises a friction damping unit, a torsion spring, and a task light. In further embodiments, latching mechanisms for the cover unit and for the storage drawers are provided.

BRIEF DESCRIPTION OF THE DRAWINGS

A better and more complete understanding of the present invention and the advantages thereof will be gained from the following detailed description, claims, and accompanying drawings in which:

FIG. 8 is an enlarged rear perspective view of the currency storage drawer, including several dispenser units mounted therewithin;

FIG. 9 is an enlarged rear perspective view of the cover latching mechanism and one of the catch assemblies which has been removed from the cover unit;

FIG. 10 is a partial plan view of the cover latching mechanism showing the pivot plate and portions of the connecting links;

FIG. 11 is a front perspective view of the drawer latching mechanism;

FIG. 12 is an exploded view of the drawer latching mechanism of FIG. 11;

DETAILED DESCRIPTION OF THE INVENTION

Figure 1:
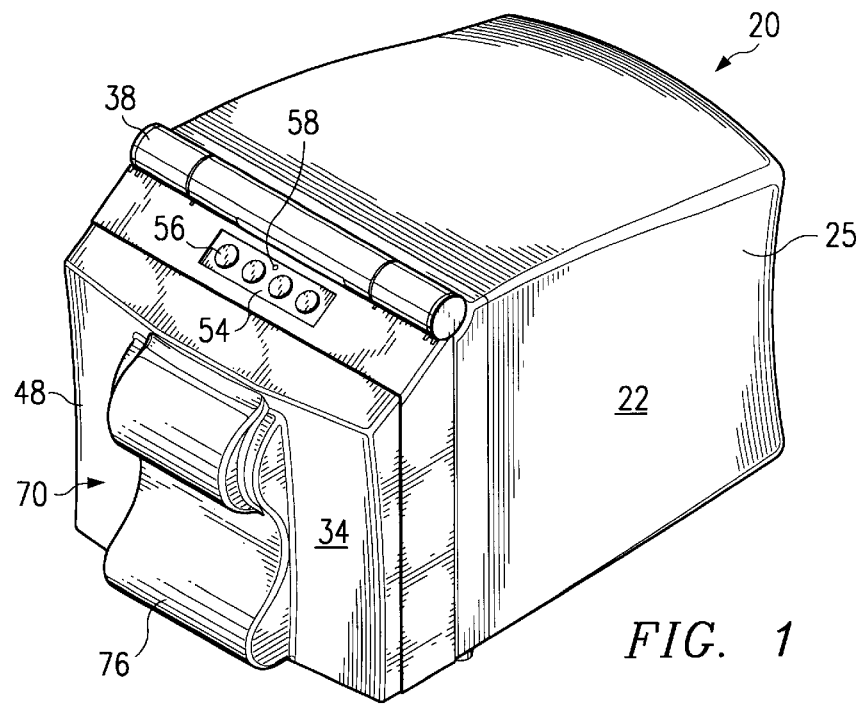
FIG. 1 is a front perspective view of a point of sale device according to a preferred embodiment of the current invention, wherein the cover unit is in the closed configuration.

With reference to the accompanying FIGS. 1–13, wherein like reference numerals designate like or corresponding parts throughout the several views, the present invention is explained hereafter.

Figure 2:
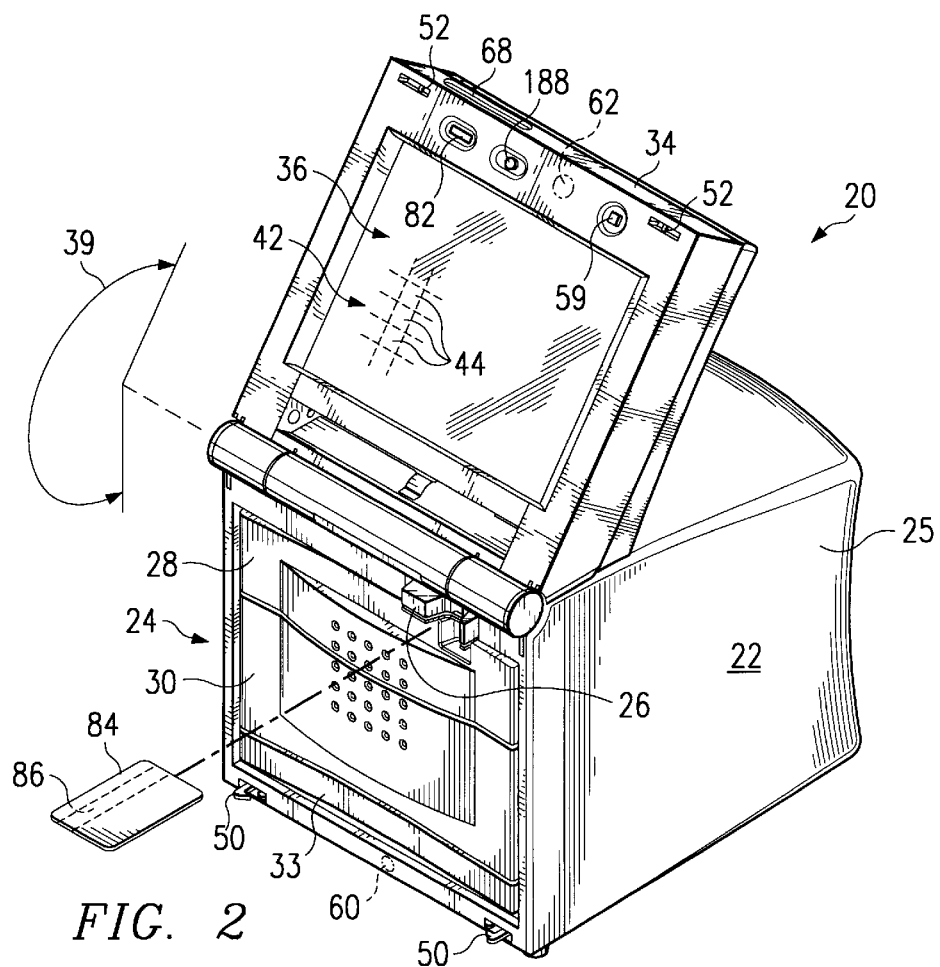
FIG. 2 is a front perspective view, similar to FIG. 1, wherein the cover unit is in the open configuration.
Figure 3:
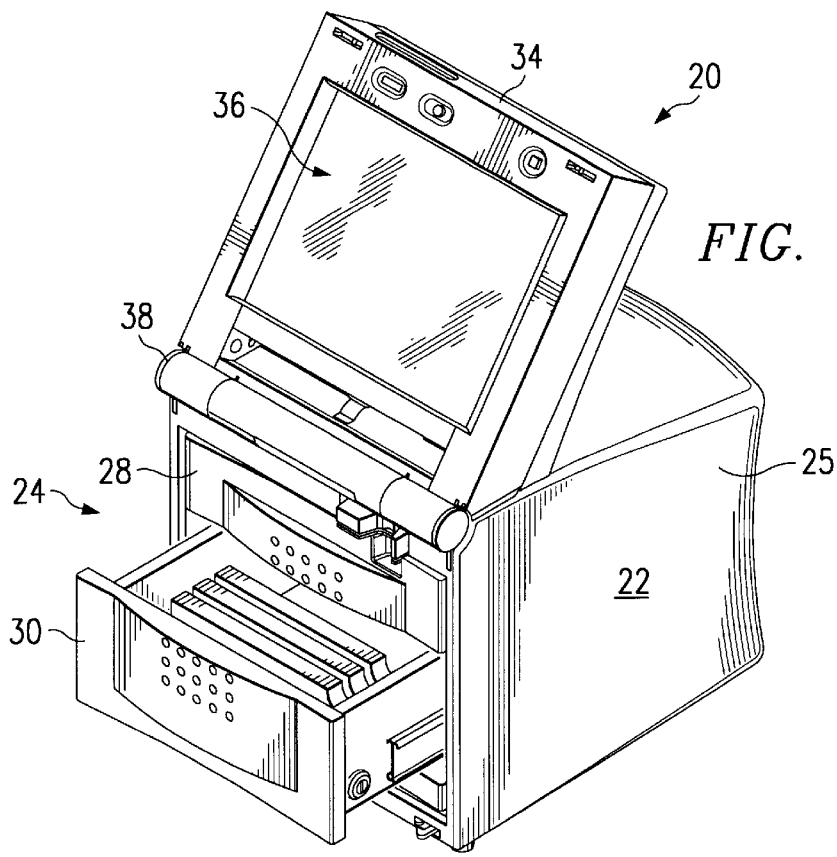
FIG. 3 is a front perspective view, similar to FIG. 2, wherein a currency storage drawer is in a partially opened position such that the contents of the drawer are visible.

FIGS. 1 and 2 illustrate perspective views of a point of sale (hereinafter abbreviated POS) device 20 according to a preferred embodiment of the current invention. The POS device of the preferred embodiment is particularly suited for use on international aircraft flights and other transportation means. It will be readily apparent, however, that the POS device can also be used in other settings, for example at sporting events, at conventions, and in vehicle-based services (e.g., mobile check cashing, catering).

The POS device POS device 20 comprises a base unit 22 having a front surface 24 and an exterior casing 25 which define an interior volume. Mounted in the interior volume and accessible from the front surface 24 is at least one transaction appliance. A transaction appliance, as used in this application, is an apparatus or device adapted to facilitate a financial transaction. As best seen in FIG. 2, the POS device 20 in the preferred embodiment has four transaction appliances accessible from the front surface 24: a card reader 26, storage drawers including a receivables storage drawer 28 and a currency storage drawer 30, and a bar code scanner 32 (FIG. 4) stored in scanner compartment 33. The structure and function of these and other transaction appliances are described in greater detail below.

A cover unit 34 having a display screen 36 is connected to the base unit 22 by a hinge mechanism 38 interposed between the base unit 22 and the cover unit 34 such that the cover unit can be moved through a range of positions (as indicated by arrow 39 in FIG. 2) between a closed configuration (FIG. 1) and a fully open configuration (FIG. 2). In the closed position, the cover unit 34 is positioned with the display screen 36 facing and directly in front of the front surface 24 of the base unit 22 such that the display screen 36 is not externally visible (i.e., not visible from the outside of the POS device) and external access (i.e., access from outside of the POS device) to one or more of the transaction appliances is blocked by the cover unit 34.

In the preferred embodiment, the exterior dimensions of the POS device are adapted to allow the POS device to be carried on the top of a standard aircraft aisle trolley (not shown) of the type commonly used for beverage service, meal service and for duty-free sales. It will be readily apparent, however, that POS devices having other exterior dimensions are within the scope of the current invention.

A control unit 40 (FIGS. 5, 6) is located in either the base unit 22 or the cover unit 34. The control unit 40 controls the operation of the display screen 36, the operation of various subsystems on the device 20, and the running of software programs which facilitate the point of sale transactions. These software programs can include programs for performing, among other things, currency exchange calculations, duty-free sales and inventory management, credit card processing routines, preparation of Customs' reports, transaction reports, and credit card lists. They can also include database programs for accessing and updating database information stored in the device. In the preferred embodiment, the control unit 40 is located in the cover unit 34 behind the display screen 36.

An input unit is located on either the base unit 22 or the cover unit 34 for supplying input signals to the control unit 40. The input unit allows the user to make selections or give instructions to the POS device 20. In the embodiment shown, the input unit comprises an electronic touch screen unit 42 mounted to the cover unit 34 over the display screen 36. The touch screen unit 42 can comprise a transparent touch sensitive film divided into a grid of discrete regions (representative examples of which are designated by reference numeral 44 in FIG. 2) which provide a location signal to the control unit 40 corresponding to the position of the grid region contacted by the user. Alternatively, the touch screen unit 42 can comprise a transparent sheet of resistive film (not shown) which provides a continuously variable location signal to the control unit 40 corresponding to the position on the sheet contacted by the user. Other types of touch screen devices known in the art can also be used. By mounting the touch screen unit 42 over the display screen 36, the user can provide information, make selections, or give instructions to the POS device 20 by touching areas of the touch screen directly above graphic symbols generated on the display screen 36 by the control unit 40.

While the preferred embodiment of POS device 20 utilizes a touch screen unit 42 mounted over display screen 36 for the input unit, it will be readily apparent that other devices can be used as the input unit, for example, a computer keyboard unit of the type having a conventional typewriter-style key layout, a keypad unit of the type having a custom arrangement of keys, a computer mouse, a joy stick, a track ball, or other computer input devices known in the art can be used for the input unit without departing from the scope of the current invention. In these alternative embodiments, the input unit can be mounted on either the base unit 22 or the cover unit 34.

In the preferred embodiment shown, the cover unit 34 is adapted to cover and therefore block access to the entire front surface 24 of the base unit 22 when in the closed configuration. As best seen in FIG. 1, when in the closed configuration, the outside casing 25 of the base unit and the outside casing 48 of the cover unit form a self-enclosed casing which prevents access to the interior of the POS device 20. The outside casings 25, 48 in the preferred embodiment are formed of a resin-filled composite material, for example fiberglass, carbon fibers, or the like, which results in a very strong but light structure.

To further enhance the security of the POS device 20, a cover latching mechanism 49 can be provided for latching the cover unit 34 in the closed configuration. Referring now also to FIGS. 9–10, in the preferred embodiment, the cover latching mechanism 49 comprises a pair of pawls 50 pivotally mounted in the base unit 22 and a pair of catch members 52 mounted in the cover unit 34 such that pawls 50 can engage catch members 52 when the cover unit 34 is in the closed position, thereby latching the cover unit in the closed configuration. To unlatch the cover unit 34 from the base unit 22, the cover latching mechanism is operated to pivot pawls 50 such that catch members 52 are disengaged, thus allowing the cover member 34 to be moved into the open position. While the cover latching mechanism 49 of the preferred embodiment comprises a pair of pawls 50 mounted on base unit 22 and a pair of catch members 52 mounted on cover unit 34, it will be readily apparent that a locking mechanism comprising a different number of pawls and catch members could be utilized, and the locations of the pawls and catch members could be interchanged without departing from the scope of the current invention.

In the preferred embodiment, each catch member 52 is mounted in a catch assembly 53 which is rigidly attached to cover unit 34 (for clarity, the catch assembly 53 is shown removed from cover unit 34 in FIG. 9). The catch assembly 53 is adapted to allow lateral movement of catch member 52 against the bias provided by one or more springs 51. This arrangement allows a slanted head 50a formed on pawl 50 to force the catch member 52 laterally out of the way (for example, to the left of the position shown in FIG. 9) for initial insertion of the pawl 50 into the catch assembly 53. Once the pawl head 50a is past the catch member 52, the bias of springs 51, moves the catch member 52 back (for example, to the position shown in FIG. 9) to engage a notch 50b formed behind pawl head 50a. This configuration allows the pawls 50 to engage the catch members 52 when the cover unit is moved to the closed configuration without requiring any movement of the pawls 50. Once so engaged, however, the pawls 50 will not disengage the catch members 52 until the pawls are rotated into the open position by the latching mechanism. For example, the right pawl must be rotated in a clockwise direction to move from the engaged position shown in FIG. 9 to the open position (not shown). It will be readily apparent that other configurations for the catch members, including fixed catch members, can be used without departing from the scope of the invention.

Although the POS device 20 can be turned on and off using a manual power switch 59, a cover sensor assembly can be provided to detect whether the cover unit 34 is in the closed configuration and to provide a corresponding signal to the control unit 40. This cover sensor assembly allows the control unit to automatically turn off the POS device 20 if the unit is left on when the cover unit 34 is moved into the closed configuration, thereby conserving battery life when the unit is being operated by batteries. As best seen in FIG. 2, in the preferred embodiment, the cover sensor assembly comprises a magnet 60 (shown in phantom) mounted in the base unit 22 and a sensor 62 (shown in phantom) mounted in the cover unit 34 such that the sensor 62 can detect the proximity of the magnet 60 when the cover unit 34 is moved into the closed configuration. It will be readily apparent that the location of the sensor and magnet can be interchanged and that other types of sensors, including optical sensors and mechanical sensors, can be used to detect the configuration of the cover unit 34 and provide a corresponding signal to the control unit 40 without departing from the scope of the current invention.

For maximum security, the operation of the cover latching mechanism 49 can be controlled by a lock. In the preferred embodiment, an electronic combination lock 54 having a plurality of lock keys 56, a lock indicator 58 and associated lock circuitry (not shown) is provided on the outer surface of the cover unit 34 and operably connected to the cover latching mechanism. To operate the combination lock 54, the user enters a sequential code by pressing the lock keys 56. The lock indicator 58 will light up every time a lock key is pressed to acknowledge the acceptance of the user entry. The user has a preselected period of time to enter the correct key sequence. If the correct code is not entered within the preselected time, the lock circuitry can shut down for a second preselected period during which it will not accept any entries and consequently will not give any feedback by blinking the lock indicator 58. If this happens, the user must wait for the second preselected period to expire and then start entering the correct code once pressing the lock keys 56 causes the lock indicator 58 to blink. While the lock of the preferred embodiment is an electronic combination lock, it will be readily apparent that other forms of electronic or mechanical locks, for example, mechanical key locks, mechanical push-button locks, and locks activated by a magnetic swipe card, can be used without departing from the scope of the current invention.

When the POS device 20 is locked in the closed configuration, the storage drawers 28, 30 are covered and cannot be opened and the remaining transaction appliances such as the card reader 26 and the bar code scanner 32 cannot be accessed. Thus, the POS device 20 is both tamper-resistant and damage-resistant when in a closed configuration. Only the combination lock 54 is exposed on the outside surface of the unit.

Figure 5:
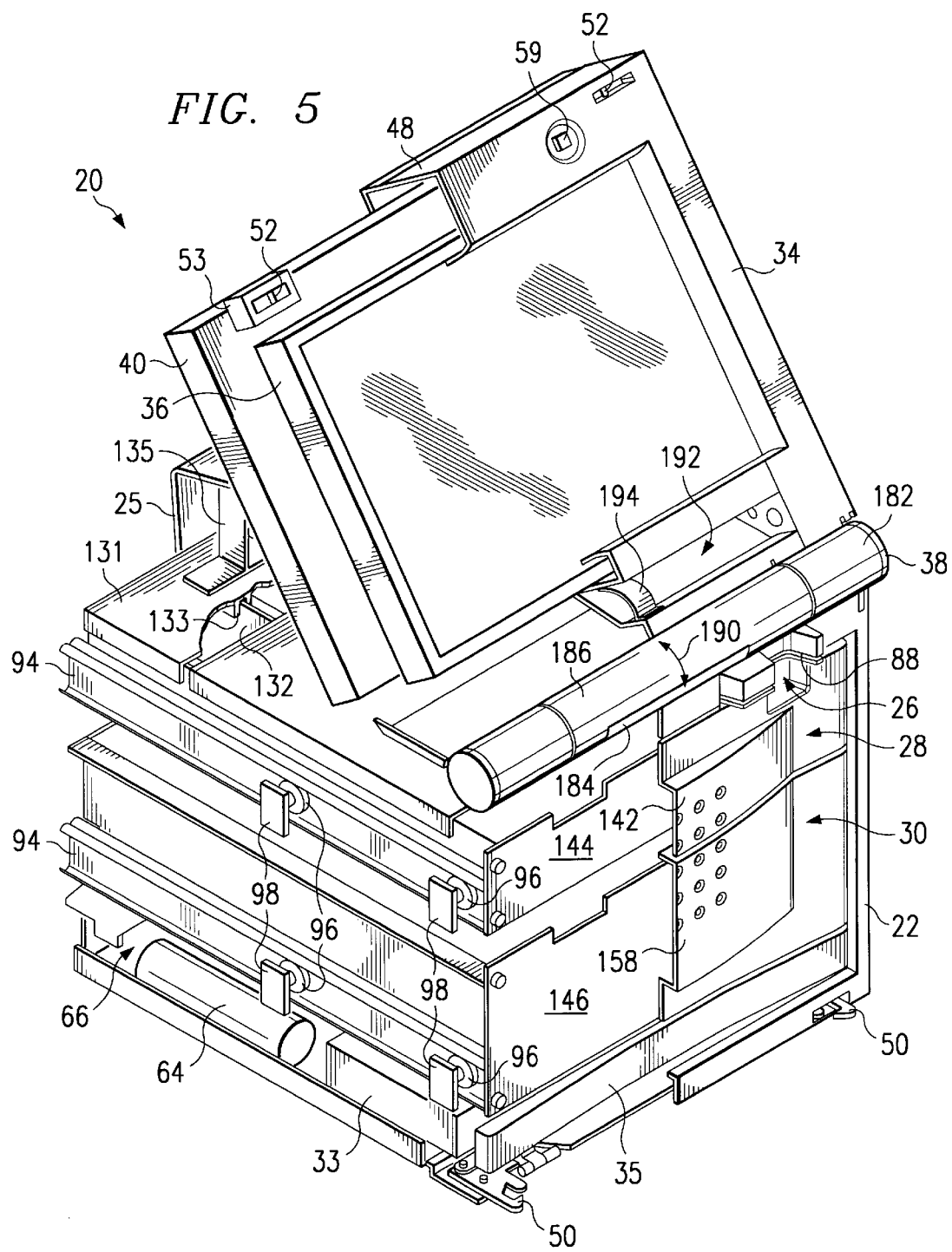
FIG. 5 is a front perspective view with a portion of the housing broken away to show interior structure.
Figure 6:
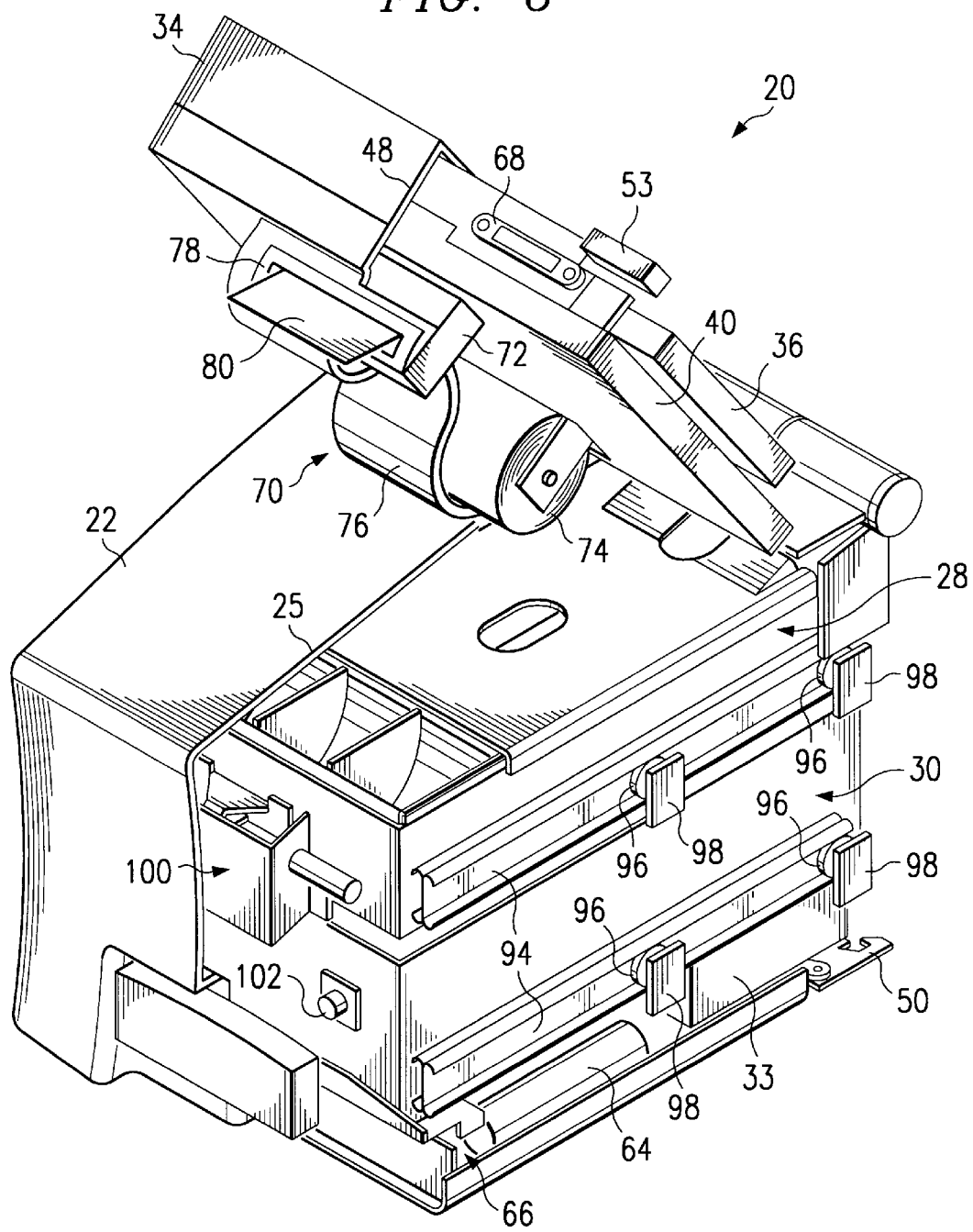
FIG. 6 is a rear perspective view with a portion of the housing broken away to show interior structure.

To allow use of the POS device 20 onboard transportation means, for example aircraft, trains, ferries, buses, etc., and to allow its use at other locations where electrical power may not be conveniently available, batteries 64 can be located within either the base unit 22 or the cover unit 34. In the preferred embodiment, a plurality of batteries 64 are mounted in a battery compartment 66 located in the lower portion of the base unit 22. (FIGS. 5-6.) In the preferred embodiment, the POS device 20 can be powered solely by the battery 64 mounted internally. A connector port 68 (FIGS. 2 and 6) can be provided allowing the POS device 20 to be powered by external electric power when available. The connector port 68 is preferably located such that it is accessible when the cover unit 34 is in either the closed configuration or the open configuration. In the preferred embodiment, the connector port 68 is located on the outside surface of cover unit 34 which is opposite the side connected to hinge member 38.

As best seen in FIG. 6, a printer assembly 70 controlled by the control unit 40 is provided for printing receipts, summary reports and other documents. The printer assembly includes a printer 72 and a paper supply 74. In the preferred embodiment, the printer 72 is a thermal printer, however, it will be readily apparent that other types of printers could be used including ink jet printers and impact printers. The printer assembly 70 can be located in any part of the POS device, however in the preferred embodiment, the printer unit is located in the cover unit 34. A printer cover 76 is removably mounted on the cover unit 34 to protect printer 72 and paper supply 74. When the printer cover 76 is in position, paper from the paper supply 74 passes through the printer 72 and out of the POS device through paper slot 78 such that printed paper 80 can be removed from the printer. Printed paper 80 may be a receipt, a transaction report, or other type of printed document. In the preferred embodiment, the paper supply 74 and printer cover 76 are located such that paper supply 74 is accessible when the cover unit 34 is in either the open configuration or the closed configuration. This allows routine maintenance, such as changing the paper supply to be performed without requiring access to the secure portions inside the POS device.

The display screen 36 provides an interface between the control unit 40 and users of the POS device 20. Programs executed by the control unit 40 cause the display screen 36 to display text, symbols and/or graphics which can provide information to the user, for example, currency exchange rates, merchandise prices, and event schedules, or prompting the user to perform certain tasks or operations relating to a transaction. In the preferred embodiment, the display screen 36 and touch screen unit 42 provide a graphical interface which allows two-way communication between the control unit 40 and the user without requiring the use of a separate keyboard or additional input devices.

To allow the presentation of high resolution graphic images, for example, a representation of different types of currency suitable for identification purposes, the display screen 36 in the preferred embodiment has a resolution of at least about 640 pixels in one direction and at least about 480 pixels in the other direction. To allow the high resolution graphics to be displayed in realistic color, the display screen 36 in the preferred embodiment is capable of displaying at least about 256 different colors. While the display screen 36 may be of any type, for example, a conventional video (electron gun) display or a gas plasma display, in the preferred embodiment the display screen 36 is a liquid crystal display (LCD) type display. The thin profile and relatively light weight of an LCD-type display allows the display screen 36 to be incorporated into the cover unit 34 such that the cover unit forms a compact unit which can be easily moved between the opened and closed configurations. It is preferred that the display screen have a viewable area dimensioned to allow the display of full size images of various types of currency. Therefore, one embodiment of the POS device has a display screen 36 having a viewable area with dimensions of at least about 3 inches along one side and at least about 6 inches along the adjacent side. In the preferred embodiment, the display screen 36 has a viewable area with dimensions of at least about 6 inches along one side and at least about 8 inches along the adjacent side.

To allow the use of the display screen 36 under all lighting conditions, the display screen 36 of the preferred embodiment includes a backlighting unit (not shown) positioned behind the screen to provide illumination when POS device 20 is turned on. A screen brightness control 82 can be provided for controlling the amount of screen illumination to provide optimum viewing conditions.

While the control unit 40 can be any type of programmable computer or other device suitable for controlling the display screen 36, controlling the operation of various subsystems on the device 20, and running software programs which facilitate the point of sale transactions, in the preferred embodiment, the control unit 40 comprises a programmable computer having a processor unit, processor associated random access memory (RAM), a primary mass storage device and control circuitry. In the preferred embodiment, the programmable computer is of a type compatible with the IBM-PC standard originated by International Business Machines but later adopted as an independent industry standard. To provide adequate performance, the processor unit of the programmable computer has a clock speed of at least about 100 megahertz, at least about 16 megabytes of processor associated RAM, and a primary mass storage device having at least about 500 megabytes of memory capacity. The primary mass storage device can store the operating systems for the computer system and the program instructions for the control unit. The primary mass storage device can also store database information, for example, currency exchange rate tables, product codes, credit card data, merchandise prices, inventory information and customer order information. The primary mass storage device can also store (in digital form) detailed color images of persons, products, maps and/or images of foreign currencies. These images can be displayed on the display screen 36 for purposes of information, identification or product selection. For example, full size, full color images of foreign currencies can be provided for purposes of identification or verification when an unfamiliar currency is presented to the attendant during a transaction. This allows the POS device to facilitate transactions in any known currency.

In the preferred embodiment, the primary mass storage device is a magnetic disk drive. It will be readily apparent, however, that other mass storage devices, for example, a recordable CD-ROM optical drive or a tape cartridge, can be used without departing from the scope of the current invention. In addition, the control unit 40 can further comprise a backup mass storage device having at least about 4 megabytes of memory capacity. The backup mass storage device preferably comprises a semiconductor-based memory device, for example, a static random access memory (SRAM) card or a flash memory card, having at least about 4 megabytes of memory capacity. The backup mass storage device provides memory capacity sufficient for recording important transaction information in case the primary mass storage device suffers a failure. The backup mass storage device can have less memory capacity than the primary mass storage device because it is not required to hold the operating system or program instructions for the control unit.

The POS device 20 can further comprise computer network communications circuitry (not shown) connected to the control unit 40 and accessible when the cover unit 34 is in either the open configuration or the closed configuration. In the preferred embodiment, the network communications circuitry is accessible by means of the connector port 68 positioned on an outside surface of cover unit 34, however, it will be readily apparent that a separate connector port can be provided. Alternatively, the network communications circuitry can be accessed by remote means including, for example, radio frequency (RF) or infra-red (IR) communication devices as are known in the art. The network communication circuitry allows communications between the control unit 40 and an external computer or other device external to the POS device 20. Communication over the network communication circuitry can be used to download transaction records, merchandise inventories, and other information from the POS device to the external computer, or to upload new programming or updated values from an external computer to the POS device. In the preferred embodiment, the network communications circuitry comprises a circuit card that is automatically switchable to be compatible with the 10baseT ethernet standard and the 100baseT ethernet standard, however, it will be readily apparent that network communications circuitry conforming to either one of these standards or to other standards could be used.

The control unit 40 of the POS device 20 can further comprise auxiliary interface circuitry (not shown) providing the necessary interfaces between the programmable computer unit and the associated data-related peripheral devices including printer 72, card reader 36 and bar code scanner 32. The auxiliary circuitry can communicate with the programmable computer unit, however, it can also be equipped with its own microprocessor or microcontroller allowing the circuitry to function independently of the programmable computer unit. The interface circuitry can therefore provide direct control over non-data related devices such as latching solenoids and task lights. Further, since the auxiliary circuitry is independent of the programmable computer unit, it can serve to manage the power supply of the POS device 20 to control start-up and shut-down of the programmable computer unit and to manage power usage from the internal batteries 64. In the preferred embodiment, control unit 40 includes auxiliary interface circuitry comprising an interface circuit board utilizing a single chip microcontroller. The interface circuit board is mounted in the cover unit 34 adjacent to the programmable computer unit.

As previously discussed, the POS device 20 includes at least one transaction appliance mounted in the interior volume and accessible from the front surface 24 when the cover unit 34 is in the open configuration, but blocked by the cover unit 34 (and thus secured) when the cover unit is in the closed configuration. As best seen in FIG. 2, in the preferred embodiment, one of the transaction appliances is a card reader 26 mounted in the front surface 24 of the base unit 22 and operatively connected to the control unit 40. The card reader 26 is of a type capable of reading information from a magnetic strip on a credit card or debit card. In the preferred embodiment, a card 84 including a magnetic strip 86 (shown in phantom) is inserted into a card slot 88 (FIG. 5) in card reader 26 and then quickly removed in order to read the information contained on the strip. It will be readily apparent, however, that card readers having other configurations, for example, a swipe-type card reader in which the card is partially inserted into a groove and moved longitudinally to effect the read operation, can be used without departing from the scope of the current invention.

In the preferred embodiment, card reader 26 is also capable of interacting with smart cards (not shown) of the type which contain electronic memory devices for the storage of information relating to identification or value. The interaction of the card reader 26 with a smart card can be limited to the reading of information from the electronic memory device on the card, or it can include the reading of information from the electronic memory device, the processing of the information as it relates to a transaction, and the writing of new information to the electronic memory device on the card such that the original data is changed.

Figure 4:
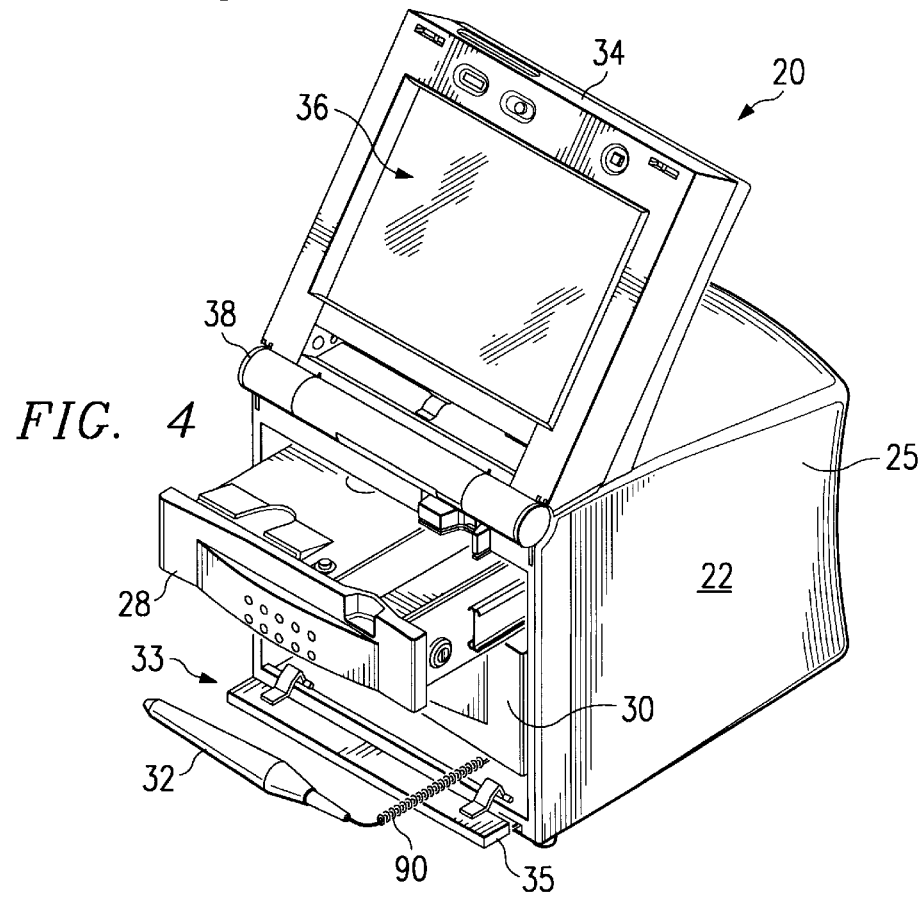
FIG. 4 is a front perspective view similar to FIG. 3, wherein a receivables storage drawer is partially open such that the contents of the drawer are visible and the scanner compartment door is open with the bar code scanner withdrawn.

As best seen in FIGS. 4-5, another of the transaction appliances in the preferred embodiment of the POS device is an optical bar code scanner 32 operatively connected to the control unit 40 and capable of reading printed bar codes. The bar code scanner 32 can be of any conventional type, including a fixed scanner built into front surface 24 and capable of scanning bar codes placed proximate to a scanning window, a hand held gun-type unit which can be pointed at a bar code for scanning, and a hand-held wand unit which must be moved across a bar code for scanning. In the preferred embodiment, bar code scanner 32 comprises a hand held-wand removably mounted in a compartment 33 of the base unit 22 and accessible from front side 24 of the base unit by means of a hinged compartment door 35. An electrical cable 90 is connected between the bar code scanner 32 and the base unit 22 for transmitting bar code information to the control unit 40. The bar code scanner can also include additional circuitry (not shown) located in the base unit 22 to process signals received through cable 90 before relaying the data to the control unit.

Referring now to FIGS. 3–8, another of the transaction appliances which can be included in POS device 20 is a secure storage drawer having an interior volume for storage and being slidably mounted in the front surface 24 of the base unit 22 so as to be movable between an open position and a closed position. In the embodiment shown, two storage drawers 28, 30 are provided, however POS devices having other numbers of secure storage drawers are within the scope of the current invention. Both storage drawers 28, 30 are shown in a closed position in FIG. 2; the lower storage drawer 30 is shown in a partially opened position in FIG. 3; and the upper storage drawer 28 is shown in a partially opened position in FIG. 4. To allow maximum extension of the storage drawers, extendable rails 94 are provided having the form of back-to-back C-shaped channels (best seen in FIGS. 5 and 6). Each storage drawer is equipped with rollers 92 (FIGS. 7-8) which ride along the interior channel of the rails 94 while the exterior channels of each rail 94 rides along rollers 96 attached to a portion 98 of the exterior casing 25 of the base unit 22. Stop members 99 formed on drawers 28, 30 engage similar stops on the rails 94 to prevent the drawers from accidentally extending too far. While this method of mounting the drawers allows for good extension and easy operation, it will be readily apparent that other mounting methods could be used without departing from the scope of the current invention.

To enhance security of the POS device 20, a latching mechanism 100 can be provided for securing each storage drawer in the closed position. In the preferred embodiment, latch 100 is a solenoid-operated mechanism operably connected to control unit 40 such that the storage drawers 28, 30 are unlocked in response to the software program running on the control unit 40. A drawer sensor unit 102 (FIG. 6) can be provided in the base unit 22 positioned near the rear end of a storage drawer. The sensor unit 102 is capable of detecting whether the drawer is in the closed position and providing a corresponding signal to the control unit 40. In this manner, the software program can monitor the status (open or closed) of each storage drawer so as to better control the execution of the transactions. The drawer sensor unit 102 can be any of various types known in the art including magnetic, optical, or mechanical detectors. In the preferred embodiment, the drawer sensor unit 102 is a magnetic sensor which detects the proximity of a magnet 104 (FIG. 8) mounted on the rear surface of storage drawer 30. A similar detector and magnet (not shown) are used to determine the status of drawer 28.

Figure 7:
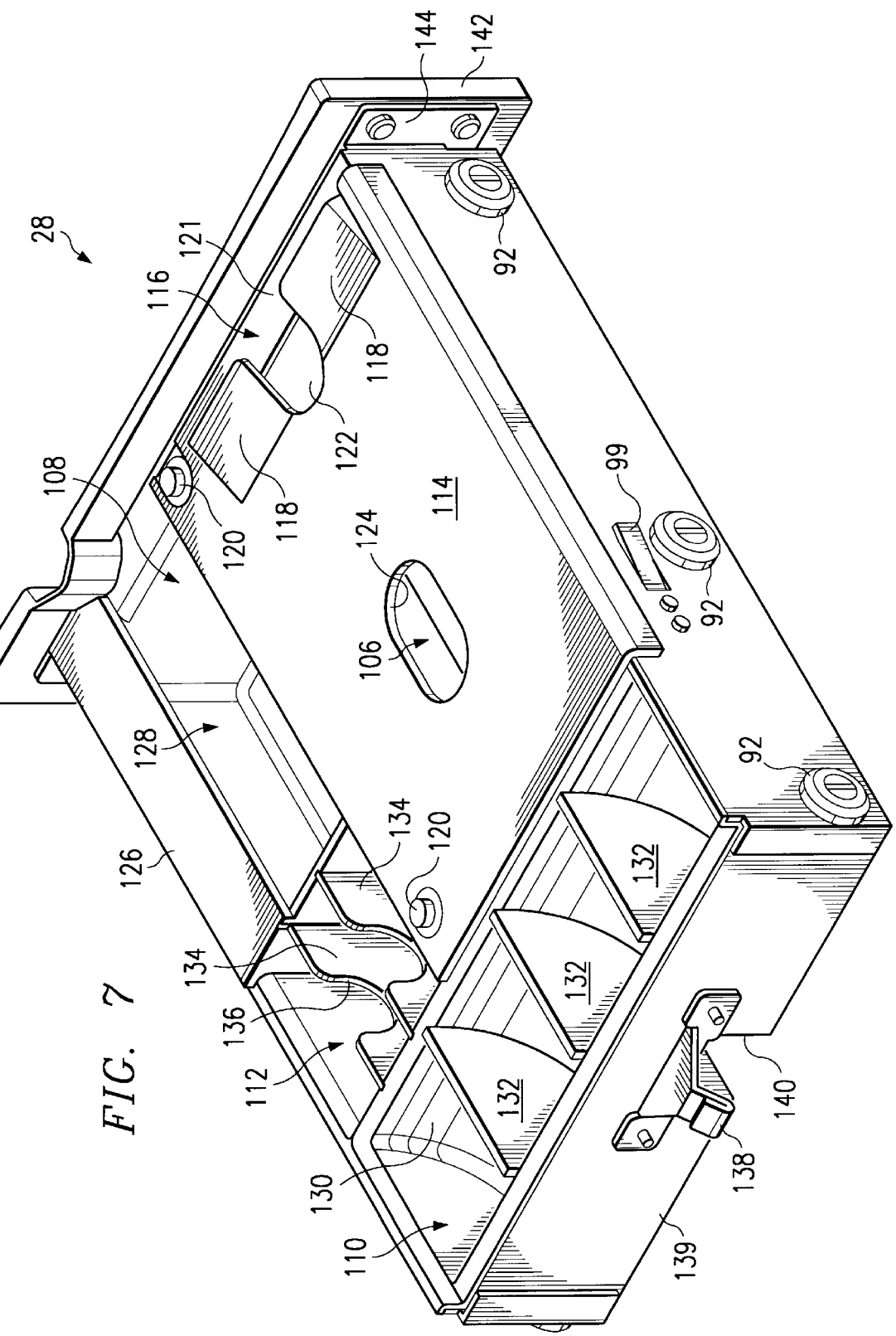
FIG. 7 is an enlarged rear perspective view of the receivables storage drawer.

The storage drawers of the POS device 20 can be adapted to meet the requirements of specific transaction types. Referring now to FIG. 7, in the preferred embodiment the upper storage drawer 28 is a receivables drawer for storing transaction receivables and other laminar-shaped objects associated with a transaction, for example currency, checks, credit card authorization slips, coins, tickets, and other such items. The receivables drawer 28 of the preferred embodiment includes first, second, third, and fourth compartments 106, 108, 110, and 112, respectively. The first compartment 106 is adapted to receive and securely store high value receivables such as currency and other negotiable instruments. A one-way lid 114 having an elongate input slot 116 formed by upwardly angled members 118 is secured to drawer 28 by bolts 120 thereby covering the first compartment 106. A security lip 121 projects from the edge of the compartment 106 immediately below input slot 116. An access notch 122 sized to accommodate the user's finger is formed in the one-way lid 114 between the upwardly angled members 118. Laminar-shaped transaction receivables such as currency can be inserted laterally through input slot 116 into first compartment 106. The user can then press down on the receivables inside first compartment 106 by inserting one finger through access notch 122 to ensure that the receivables fall below security lip 121. Once below security lip 121, the receivables cannot be easily removed through input slot 116. Optionally, the receivables can be inserted into a special envelope (not shown) prior to being inserted through slot 118. Such envelopes can be adapted to have a length and width slightly less than the length and width of first compartment 106 to ensure that the enclosed receivables cannot be manually removed from the compartment after being pushed below the security lip 121. The receivables can, however, be easily extracted at a service center by removing retainer bolts 120 and one-way lid 114. For added security, retainer bolts 120 can be of a type requiring a special tool for removal. A second opening 124 can be formed in one-way lid 114 to allow visual inspection of the first compartment 106 without requiring removal of the one-way lid. If provided, the second opening 124 should be sized to prevent extraction of receivables stored within the first compartment.

The second compartment 108 of receivable drawer 28 is adapted to secure transaction-related objects while allowing for the manual insertion and manual withdrawal of such objects without the use of tools. A partial lid 126 is provided which covers a portion of second compartment 108 but leaves a substantial opening 128 for inserting and withdrawing receivables. The area (viewed from above) of opening 128 is within the range of about 40% to about 75% of the total area (viewed from above) of second compartment 108. In the preferred embodiment, the opening 128 has an area of about 66% of the area of the second compartment. The second compartment 108 can be used for the storage of transaction receivables which are not negotiable instruments, for example receipts or credit card authorization slips, and therefore do not require the same level of security as the receivables stored in the first compartment 106.

The third compartment 110 is adapted for the storage and/or manual dispensing of coins and other small objects related to transactions. The third compartment 110 has a curved bottom 130 which facilitates the manual dispensing of coins. A plurality of dividers 132 are provided to subdivide third compartment 110 for the storage of coins having different denominations. In the preferred embodiment, three equally spaced dividers 132 are provided for subdividing third compartment 110 into four equal sections, however, other configurations of the third compartment are within the scope of the current invention.

As best seen in FIG. 5, to ensure that the coins or other small objects stored in third compartment 110 do not spill out during transportation and handling of the POS device, a compartment cover 131 can be mounted in base unit 22 such that the cover 131 fits closely over third compartment 110 when receivables drawer 28 is in the closed position. To further ensure that objects do not shift from one subdivision of third compartment 110 to another, cover 131 can be provided with labyrinth seals 133 which fit closely along the top of dividers 132 when drawer 28 is closed. In the preferred embodiment, cover 131 is mounted in base unit 22 by means of mounting bars 135 connected between cover 131 and the inner surface of exterior casing 25, however it will be readily apparent that other mounting means are within the scope of the current invention. Note that the compartment cover 131 is not shown in FIG. 6 in order to better illustrate the details of receivables drawer 28.

In the preferred embodiment, fourth compartment 112 is adapted for the storage of small rectangular objects such as tickets, passes, stamps and the like. One or more dividers 134 are provided to separate different types of objects or objects having different denominations. A notch 136 formed in each divider 134 can be provided to facilitate grasping and dispensing of the contents of the fourth compartment 112.

A striker 138 is mounted on rear surface 139 of receivables drawer 28 and adapted to interact with latching mechanism 100 for locking the drawer in the closed position. In the preferred embodiment, a clearance notch 140 is formed in the lower rear surface of the drawer 28 to provide clearance for the latching mechanism. A face plate 142 is mounted on the front surface 144 of the drawer 28 to fully seal the drawer opening formed in front surface 24 of base unit 22.

Referring now to FIG. 8, in the preferred embodiment the lower storage drawer 30 is a currency drawer for storing and manually dispensing laminar objects, for example, currency, bills, small packages or bundles of currency, and other such items. The currency drawer 30 of the preferred embodiment includes front, rear, right, and left walls 146, 148, 150 and 152, respectively, defining a single storage area 154. A striker 156 is attached to the rear wall 148 and adapted to cooperate with latch mechanism 100 for locking currency drawer 30 in the closed position. A face plate 158 is attached to front wall 146 to fully enclose the lower drawer opening formed in front surface 24 of base unit 22.

When the POS device 20 is being used to support foreign exchange transactions or multicurrency transactions, for example duty-free sales or currency exchange onboard an airliner, the currency drawer 30 can be used to store, sort and dispense currencies of many different types and denominations. A conventional cash-register-type till in which the currencies are stored lying flat (horizontally) in separate compartments can be provided in storage area 54 of currency drawer 30 when a limited number of different currencies or denominations are to be managed. However, the currency in a cash-register-type till can be readily pilfered by bystanders if the attendant is momentarily distracted. In addition, the horizontal storage position limits the number of different currency types and denominations which can be separately managed in a given area.

In the preferred embodiment, a plurality of individual dispensing units 160 are mounted in the storage area 154 of currency drawer 30. For the purposes of illustration, only four dispensing units 160 are shown in FIG. 8, with the remaining portion of storage space 154 being left empty. It will be readily apparent, however, that additional dispensing units 160 could be added to currency drawer 30 to completely fill storage are 154. Each dispensing unit 160 has upper, lower, end and side walls 162, 164, 166 and 168, respectively, defining an internal cavity for storing currency 169 (shown in phantom) in an upright (vertical) position. Vertical storage allows a much greater number of different currency types and denominations to be stored in a given area such that they can be readily identified and dispensed. A display notch 170 is formed at an upper corner of each dispensing unit 160, and a dispensing slot 172 is formed through the upper wall 162 of the dispensing unit to join the internal cavity and the display notch 170. The side walls 168 of the dispensing unit 160 are spaced apart to accommodate a preselected quantity of currency 169 or other laminar objects having similar dimensions. The positions of the lower wall 164 and of the end walls 166 of each dispensing unit 160 are adjustable to position the currency 169 within the internal cavity such that a corner of each bill extends outside the external cavity into the display notch 170 while the remainder of each bill remains within the interior cavity. The dispensing slot 172 is dimensioned such that only a predetermined fraction of the preselected quantity of currency 169 can pass through the dispensing slot at one time to be dispensed from dispenser unit 160. Attempting to extract an amount of currency exceeding the predetermined fraction will cause the currency to jam in the dispensing slot 172, forcing any attempted pilferer to relinquish their grasp. Thus, the dispensing units 160 reduce the likelihood that their contents can be pilfered since the dispensing slot 172 limits the rate at which the contents can be withdrawn. At a minimum, the dispensing units 160 can reduce the amount of currency taken in a given time. However, individual bills or laminar objects can be easily and quickly dispensed from the dispenser unit 160 by a trained user to efficiently complete the transaction.

In addition to providing increased storage flexibility and enhanced security as described above, the dispensing units 160 also allow predetermined amounts of currency to be inventoried directly in dispensing units 160 such that they are ready for immediate loading into a POS device without the need for further counting. This can provide quick turnaround when loading of the POS device 20 must be accomplished quickly, as between airline flights.

To further increase security and reduce the possibility that an entire dispenser unit 160 and its contents can be pilfered, the currency drawer 30 can further comprise a retaining mechanism for locking the dispenser units 160 in the currency drawer. Such a locking mechanism can comprise mechanical or electric latches, bolts, pins, and the like. Referring still to FIG. 8, in the preferred embodiment, the retaining mechanism comprises a rod 174 passing through a hole 176 formed in each dispenser unit 160 and fastened to the rear wall 148 using a threaded thumbwheel 178. Thus, the individual dispenser units 160 can rotate about retaining rod 174, however, they cannot be removed from currency drawer 30 until the retaining rod 174 has been removed by an authorized person. No additional locking mechanism is required for rod 174 because of its location within drawer 30 which is already lockable using the drawer latch mechanism. This allows the dispenser units to be quickly and efficiently serviced at a service center by removing drawer 30 and unscrewing thumbwheel 178.

In the preferred embodiment, each dispenser unit 160 further includes an extension 180 formed on one end wall 166. By applying a downward force to extension 180 (shown by arrow 182), the user can cause the entire dispenser unit 160 to rotate about retaining rod 174 such that the opposite end 166 will move upwards (as shown by arrow 184). When end wall 166 moves upward, the display notch 170 will also move upward, thereby displaying the exposed corner of currency 169 (or other laminar object) in a position where it can be readily accessed by the user for dispensing a portion of the contents.

In addition to bills of individual currency, the dispensing units 160 can be loaded with prepackaged envelopes containing a preselected assortment of currency or other laminar objects. These prepackaged envelopes or other laminar objects can be stored and dispensed by the dispenser units 160 exactly like the individual bills of ordinary currency, provided however, that the dispensing slot 172 of the dispensing unit is selected to accommodate the width of the articles to be dispensed.

It will be readily apparent that while the foregoing description described the preferred embodiment of currency storage drawer 30, many other configurations of such secure storage drawers are within the scope of the current invention.

Referring again to FIGS. 1–5, in the preferred embodiment, the hinge mechanism 38 connecting the cover unit 34 to the base unit 22 further comprises a friction damping unit (not shown) providing a force which opposes relative motion between the base unit 22 and the cover unit 34. The friction damping unit will allow the user to position the cover unit 34 at any position between the fully open and the closed configuration to allow the user to select the optimum viewing angle or to allow for the performance of maintenance. For example, the cover unit can be positioned horizontally to allow convenient access to the printer cover 76 for replacement of the paper supply 74. The hinge mechanism 38 can further comprise a torsion spring (not shown) providing a torsional bias between the base unit 22 and the cover unit 34. In the preferred embodiment, the torsion spring provides an opening bias when the cover unit 34 is in the closed configuration and provides a closing bias when the cover unit has been rotated more than about 130° from the closed configuration. In the preferred embodiment, the friction damping unit and the torsional spring are both incorporated into the right side segment 182 (FIG. 5) of hinge unit 38.

As best seen in FIG. 5, a task light (not shown) is provided in center section 186 of hinge unit 38. The task light shines through a light aperture 184 formed in center section 186 and illuminates the front surface 24 of the base unit 22 and the surrounding area allowing the user to see the contents of the storage drawers 28, 30 or to manipulate the other transaction appliances while performing a transaction. The task light is controlled by switch 186 (FIG. 2) mounted on the cover unit 34. The amount and direction of illumination provided by the task light can be controlled by rotating hinge center section 186 in the direction indicated by arrow 190 such that light aperture 184 moves with respect to a fixed light shield comprising the upper portion of base unit 22. As a greater or lesser portion of light aperture 184 remains exposed, the amount and direction of illumination provided by the task light will be adjusted.

As best seen in FIG. 5, a transaction staging compartment 192 is formed in the cover unit 34 below the display screen 36. The transaction staging compartment 192 provides a place for the user to temporarily place pens, coins, credit cards, currency, or other items, such that they will be readily visible to the user while the transaction is being performed yet not interfere with the user's operation of the transaction appliances. In the preferred embodiment, a retaining clip 194 projects from the lower surface of the transaction staging compartment 192 and is biased to press against the upper surface of the staging compartment. This allows laminar objects, for example credit cards, currency, or other documents to be secured by the clip 194 against the top of compartment 192. This arrangement leaves the lower portion of the staging compartment 192 clear for the temporary storage of pens, coins and other small objects without interfering with the storage of the laminar objects above.

Referring now to FIGS. 9 and 10, additional details of the cover latching mechanism 49 are shown. In the preferred embodiment, the latching mechanism is located just below the bar code scanner compartment 33 as shown by the relative location of the bar code scanner compartment door 35 which appears in FIG. 9. The cover latching mechanism 49 comprises a solenoid 196 connected to base unit 22 by solenoid mount 215. It further comprises a solenoid link 198, pivot plate 200, and latch links 202 and 204 which connect the solenoid 196 to pawls 50. When the solenoid 196 is not activated, the mechanism 49 positions the pawls 50 in the engaged position shown in FIG. 9 allowing the pawls to engage the catch members 52 if the cover unit 34 is in the closed position. When the solenoid is activated, each pawl 50 is rotated into the open or disengaged position such that the catch members 52 are released, thereby allowing the cover unit 34 to move out of the closed configuration. In the configuration shown in FIG. 9, the right pawl would rotate clockwise and the left pawl would rotate counter-clockwise to move from the engaged position (shown in FIG. 9) to the open position (not shown).

More particularly, the pivot plate 200 is pivotally mounted on a pivot pin 206 and connected to solenoid 196 by a solenoid link 198. Each latch link 202, 204 is connected between the pivot plate 200 and a pivoting latching pawl 50. In the preferred embodiment, the latch links 202, 204 are connected to the pawls 50 on the opposite side of the pivot post 214 from pawl head 50a. When the solenoid 196 is not activated, a tension spring 217 connected between the solenoid mount 215 and a spring post 218 on pivot plate 200 urges the pivot plate 200 to rotate in a direction opposite to that indicated by arrow 208 (FIG. 10) until the end of link 202 near link pivot 216 contacts (i.e., jams against) the side of solenoid link 198 in the vicinity indicated by arrow 199. This jammed configuration defines the engaged position for the pawls 50. The pawls 50 will remain in the engaged position except when the solenoid 196 is activated.

Activating the solenoid 196 pulls the solenoid link 198 toward the solenoid causing the pivot plate 200 to rotate in the direction indicated by arrow 208 (FIG. 10). This rotation of the pivot plate 200 causes the inside ends of latch links 202 and 204 (i.e., the ends near pins 216) to undergo an initial lateral dwell and then move inwardly in the directions indicated by arrows 210 and 212, respectively. The inward movement of latch links 202 and 204 causes the latching pawls 50 to rotate about pawl pivots 214 from the engaged position to the open or disengaged position with respect to catch members 52. This allows the cover unit 34 to be opened.

The preferred configuration of cover latching mechanism 49 shown in FIGS. 9-10 provides an additional security benefit as follows. If, when the pawls 50 are in their engaged position (for example, when the cover is latched closed), an external force is applied directly to the head end 50a of pawl members 50 in the disengaging direction (for example, if an attempt is made to force the lock open), these forces will be transmitted back to pivot plate 200 by latch links 202 and 204. These opening forces will be directed in the inward direction indicated by arrows 210 and 212 (FIG. 10). However, due to the over-centered position of link pivots 216 with respect to pivot pin 206 when pivot plate 200 is in the engaged position, the opening forces applied in the directions shown by arrows 210 and 212 will urge the pivot plate 200 to rotate in the opposite direction from that shown by arrow 208 such that the end of link 202 will remain jammed against the side of solenoid link 198, thereby preventing rotation of pivot plate 200 in that direction. Thus, the pawls 50 cannot be moved into a disengaged position with regard to catch members 52 by an external force applied to the ends 50a of the pawls and therefore the cover latch mechanism 49 cannot be forced open. While the arrangement shown is the preferred embodiment, it will be apparent that other latch mechanisms could be used without departing from the scope of the current invention.

Referring now to FIGS. 11 and 12, details of the drawer latching mechanism 100 used in the preferred embodiment of the current invention are shown. The drawer latching mechanism 100 comprises a common frame 220 mounting two solenoid operated latching subassemblies. The two latching subassemblies are essentially identical, however they are inverted with respect to one another since one subassembly controls the upper storage drawer 28 and the other subassembly controls the lower storage drawer 30. The structure and operation of the subassembly for latching the lower drawer 30 will be described in detail, it being understood that the operation of the second subassembly is virtually identical. Latch assembly frame 220 is mounted inside base unit 22 proximate to the ends of the storage drawers 28, 30 when they are in the closed position. Solenoid unit 222a is mounted to frame 220 using washer 224a and retaining nut 226a. A link 228a is connected at a first end by pin 230a to solenoid plunger 232a and at a second end to one vertex of striker plate 234a. The striker plate 234a is generally triangular in shape with link 228a being connected at a first vertex, a hole 236a being formed at a second vertex, and an elongated arm 238a being formed at the third vertex. The hole 236a in striker plate 234 is mounted over a pin 240a projecting from center support arm 242 of frame 220 and the arm 238a is inserted through a passage 244a formed through frame 220. A coil/torsion spring 246a and a retainer 248a are inserted over pin 240a to retain and bias striker plate 234a. This mounting arrangement allows striker plate 234a to rotate about two separate axis. First, striker plate 234a can rotate about axis 250a which passes through mounting pin 240a. In this rotation, arm 228a moves vertically in slot 244a and the coil/torsion spring 246a provides a torsional bias resisting the rotation of striker plate 238a about the axis 250a. Second, the striker plate 234a can rotate about axis 252a formed generally between hole 236a and arm 238a. In this rotation, arm 238a rotates in slot 244a, and the coil/torsion spring 246a acts as a coil spring to provide a bias resisting the rotation of striker plate 234a about axis 252a.

In operation, as currency storage drawer 30 is closed, the striker 156 (FIG. 8) will contact the sloping face 254a of striker plate 234a, forcing the striker plate to rotate about axis 250a against the torsional bias provided by coil/torsion spring 246a until the striker 156 passes the apex 256a of striker plate 234a, at which time the striker plate 234a will rotate back in the opposite direction under the bias of the coil/torsion spring. This will trap the striker 156 against the back side 258a of the striker plate 234a and thereby lock the currency drawer 30 in the closed position. Note that it was not necessary to activate solenoid 222a to lock drawer 30, thus saving electrical energy which can be important when POS device 20 is being operated on battery power. In order to unlock currency drawer 30, solenoid 222a is energized to retract solenoid plunger 232a, pulling vertex 256a of striker plate 234a laterally such that striker plate 234a rotates about axis 252a against the coil spring bias provided by coil/torsion spring 246a. The rotation of striker plate 234a will cause the back side 258a of the striker plate to move laterally until it is out of contact with striker 156, thereby releasing currency drawer 30 from its locked position and allowing it to open. It will be appreciated that a description of the structure and operation of the solenoid subassembly latching the receivables drawer 28 is nearly identical to that just recited, requiring only the substitution of elements identified with reference numbers ending in "b" for like numbered reference numbers ending in "a" in the previous description, and by the substitution of upper drawer striker 138 for lower drawer striker 156 in the previous description.

Figure 13:
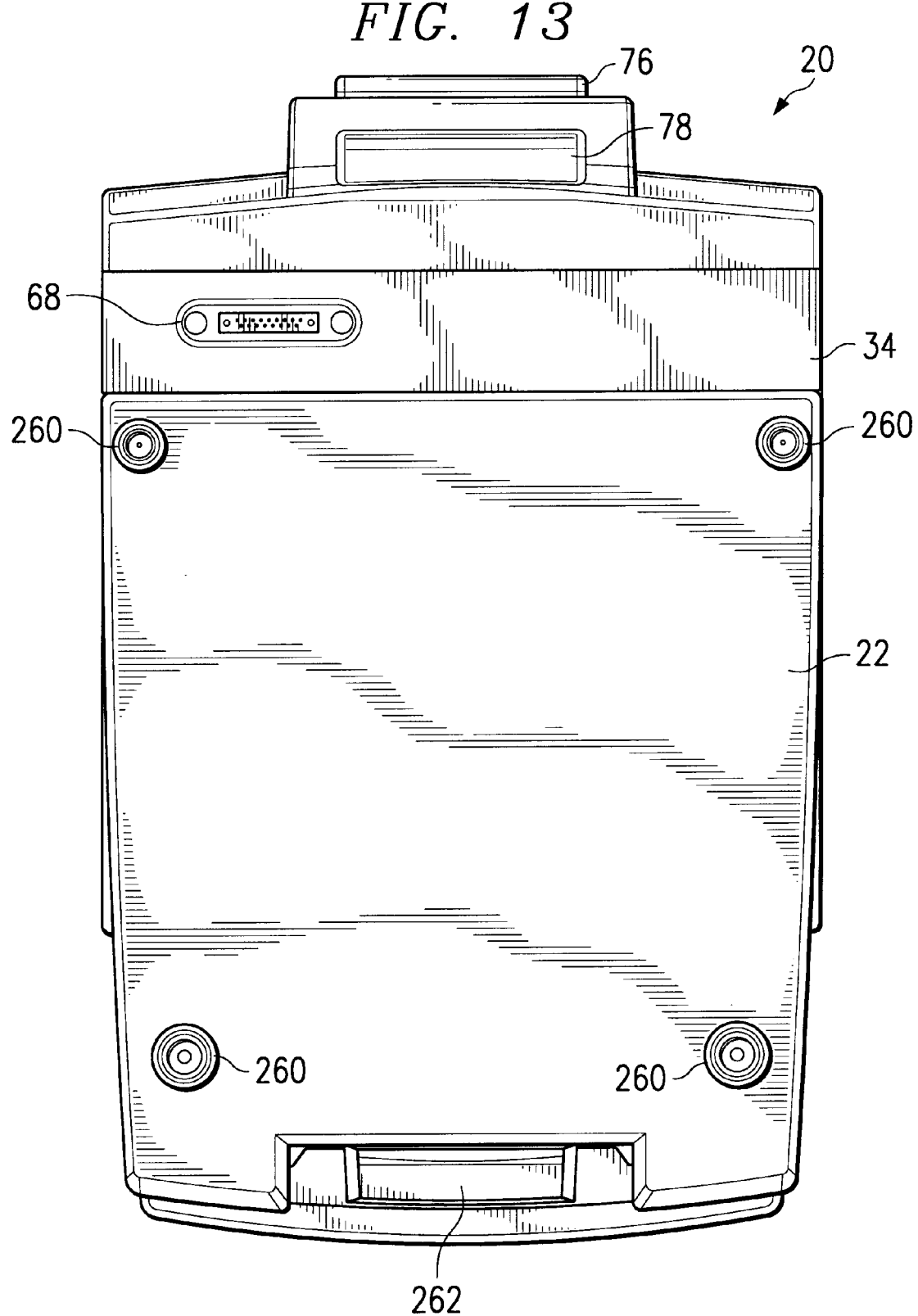
FIG. 13 is a bottom plan view of the point of sale device showing the external connection port.

Referring now to FIG. 13, a bottom view of POS device 20 shows that connector port 68 is accessible from the underside of the device when the cover unit 34 is in the closed configuration. The connector port 68 can provide both external power and a network communication connection for the control unit 40 and other systems. A plurality of support feet 260 are provided on the bottom of base unit 22 for supporting the POS device. In the preferred embodiment, the support feet are positioned such that POS device 20 can be mounted on a standard airline duty-free cart for convenient transportation throughout the cabin. A handle 262 is provided at the lower rear portion of the base unit 22 to facilitate lifting and position of the POS device.

I claim:

1. A point of sale device comprising:
    a base unit having a front surface and at least one transaction appliance accessible from said front surface;
    a cover unit having a display screen and being connected to said base unit by a hinge mechanism interposed between said base unit and said cover unit such that said cover unit can be moved between a closed configuration, in which said cover unit is positioned with said display screen facing, and directly in front of, said front surface of said base unit such that said screen is not visible and access to at least one said transaction appliance is blocked by said cover unit, and an open configuration, in which said cover unit is positioned to allow access to said transaction appliance and said display screen is visible;
    a control unit located in one of said base unit and said cover unit and controlling said display screen and various operational states of said device;

an input unit located on one of said base unit and said cover unit for supplying input signals to said control unit.

2. The point of sale device of claim 1, wherein said base unit has an interior volume adapted for storage of currency.

3. The point of sale device of claim 1, wherein said base unit has an interior volume adapted for storage of transaction records.

4. The point of sale device of claim 1, further comprising batteries located within one of said base unit and said cover unit.

5. The point of sale device of claim 4, wherein said device can be powered entirely by said batteries.

6. The point of sale device of claim 5, wherein said device can also be powered by external electric power supplied through an electrical connector port located on an outside surface of said device.

7. The point of sale device of claim 1, wherein said cover unit is adapted block access to the entire front surface of said base unit when in said closed configuration.

8. The point of sale device of claim 1, wherein said display screen has at least about 640 pixels in one direction and at least about 480 pixels in the other direction.

9. The point of sale device of claim 8, wherein said display screen is capable of displaying at least about 256 different colors.

10. The point of sale device of claim 9, wherein full size color images of foreign currencies can be displayed on said display screen.

11. The point of sale device of claim 1, wherein said display screen is a liquid crystal display type screen.

12. The point of sale device of claim 1, wherein said display screen has at least about 640 pixels in one direction and at least about 480 pixels in the other direction.

13. The point of sale device of claim 1, wherein said display screen is capable of displaying at least about 256 different colors.

14. The point of sale device of claim 12, wherein said display screen is back-lighted to provide internal illumination for said display screen.

15. The point of sale device of claim 1, wherein said input unit comprises a touch screen unit mounted on said cover unit over said display screen.

16. The point of sale device of claim 1, wherein said input unit comprises a keypad unit mounted on one of said base unit and said cover unit.

17. The point of sale device of claim 1, wherein said input unit comprises a keyboard unit mounted on one of said base unit and said cover unit.

18. The point of sale device of claim 1, wherein said control unit comprises a PC-type computer having a processor unit, processor associated random access memory, a mass storage device and control circuitry.

19. The point of sale device of claim 17, wherein said processor unit has a clock speed of at least about 100 megahertz.

20. The point of sale device of claim 18, wherein said computer has at least about 16 megabytes of processor associated random access memory.

21. The point of sale device of claim 19, wherein said mass storage device is a magnetic disk drive having at least about 500 megabytes of memory capacity.

22. The point of sale device of claim 17, wherein said computer further comprises a backup mass storage device comprising a SRAM card having at least about 4 megabytes of memory capacity.

23. The point of sale device of claim 17, further comprising network communication circuitry connected to said computer and accessible when said cover unit is in either of said open configuration and said closed configuration, said network communication circuitry allowing communication between said computer and a second device external to said point of sale device.

24. The point of sale device of claim 22, wherein said network communication circuitry is compatible with a 10baseT ethernet standard.

25. The point of sale device of claim 23, wherein said network communication circuitry is also compatible with a 100baseT ethernet standard.

26. The point of sale device of claim 22, wherein said network communications circuitry is accessible through an electrical connector port located on an outside surface of the device.

27. The point of sale device of claim 1, further comprising a printer assembly controlled by said control unit.

28. The point of sale device of claim 27, wherein said printer assembly further comprises a thermal printer.

29. The point of sale device of claim 27, wherein said printer assembly further comprises an ink-jet printer.

30. The point of sale device of claim 27, wherein said printer assembly is located in said cover unit.

31. The point of sale device of claim 30, wherein said printer assembly includes a paper supply that is accessible when said cover unit is in either of said open configuration and said closed configuration.

32. The point of sale device of claim 1, further comprising a cover latching mechanism for latching said cover unit in said closed configuration.

33. The point of sale device of claim 32, wherein said cover latching mechanism comprises a pawl pivotally mounted in one of said base unit and said cover unit and a catch member mounted in another of said base unit and said cover unit, said pawl being movable between an engaged position and an open position and being engagable with said catch member when in said engaged position to latch said cover unit in said closed configuration.

34. The point of sale device of claim 33, wherein said cover latching mechanism further comprises a solenoid and connecting linkage connected to said pawl, said solenoid and connecting linkage moving said pawl to said open position to disengage said catch member from said pawl when said solenoid is activated, thereby allowing said cover unit to move from said closed configuration.

35. The point of sale device of claim 34, wherein said connecting linkage further comprises a pivot plate and latch link;

said pivot plate being connected to said solenoid and pivotable about a pivot pin;

said latch link being connected between a point on said pivot plate and said pawl such that activating said solenoid causes said pivot plate to pivot in a first rotational direction which causes said pawl to move in a direction moving said pawl from an engaged position to a disengaged position with respect to said catch member, but applying a force to said pawl in a direction from said engaged position toward said disengaged position urges said pivot plate to pivot in a direction opposite to said first rotational direction such that the pivot plate links jam against one another and said pawl remains in said engaged position.

36. The point of sale device of claim 32, wherein said cover latching mechanism is activated by a push-button combination lock.

37. The point of sale device of claim 1, further comprising a cover sensor assembly operably connected to said control unit, said cover sensor assembly being capable of detecting whether said cover unit is in said closed configuration and providing a corresponding signal to said control unit.

38. The point of sale device of claim 1, wherein one of said transaction appliances is a card reader mounted in the front surface of said base unit and operatively connected to said control unit, said card reader being capable of reading magnetic strips on credit cards and debit cards.

39. The point of sale device of claim 38, wherein said card reader is also capable of interacting with smart cards containing electronic memory devices.

40. The point of sale device of claim 1, wherein one of said transaction appliances is a card reader mounted in the front surface of said base unit and operatively connected to said control unit, said card reader being capable of interacting with smart cards containing electronic memory devices.

41. The point of sale device of claim 1, wherein one of said transaction appliances is a optical bar code scanner operatively connected to said control unit, said scanner being capable of reading printed bar codes.

42. The point of sale device of claim 41, wherein said optical bar code scanner comprises a hand-held scanner unit removably mounted in a compartment on said front side of said base unit, said hand-held unit being removable from said compartment for use, and having an electrical cable operably connected between said hand-held unit and said base unit.

43. The point of sale device of claim 41, wherein said optical bar code scanner comprises a scanner unit mounted in said front surface of said base unit such that it can read bar codes on objects held proximate to the front of said scanner unit.

44. The point of sale device of claim 1, wherein one of said transaction appliances is a drawer slidably mounted in said front surface of said base unit and movable between an open position and a closed position.

45. The point of sale device of claim 44, further comprising a drawer sensor unit operably connected to said control unit, said drawer sensor unit being capable of detecting whether said drawer is in said closed position and providing a corresponding signal to said control unit.

46. The point of sale device of claim 44, further comprising a latch mechanism for locking said drawer in said closed position;
   said latch pivoting about a first axis against the torsional bias of the coil/torsion spring to sequentially ride over and then engage a striker connected to said drawer when said drawer is moved into said closed position, thereby locking said drawer in said closed position; and
   said latch pivoting about a second axis approximately perpendicular to said first axis and against the axial bias of said coil/torsion spring to disengage said striker when said solenoid is activated, thereby unlocking said drawer and allowing it to move into the open position.

47. The point of sale device of claim 46 wherein the latch mechanism comprises a latch member, a coil/torsion spring, and a solenoid controlled by the control unit.

48. The point of sale device of claim 44, wherein said drawer is a receivables drawer for storing objects including transaction receivables.

49. The point of sale device of claim 48, wherein said receivables drawer comprises a first compartment having a one-way lid allowing manual insertion of laminar objects but prohibiting manual withdrawal of said objects.

50. The point of sale device of claim 49, wherein said receivables drawer further comprises a second compartment having a partial lid for allowing manual insertion and manual withdrawal of transaction-related objects.

51. The point of sale device of claim 50, wherein said receivables drawer further comprises a third compartment for storing and manually dispensing coins and other small objects.

52. The point of sale device of claim 51, further comprising a compartment cover mounted in said base unit such that said cover fits closely over said third compartment when said receivables drawer is in said closed position.

53. The point of sale device of claim 44, wherein said drawer is a currency drawer for storing and manually dispensing objects including currency.

54. The point of sale device of claim 53, wherein said currency drawer comprises a till having separate compartments for storing and manually dispensing currency of various denominations and other laminar objects.

55. The point of sale device of claim 53, wherein said currency drawer comprises a plurality of dispenser units for storing and manually dispensing currency of various denominations and other laminar objects.

56. The point of sale device of claim 55, wherein each said dispensing unit has upper, lower, end and side walls defining an internal cavity having upper, lower, end and side surfaces, a display notch formed at an upper corner of said dispensing unit, and a dispensing slot formed through said upper wall of said dispensing unit and joining said internal cavity and said display notch;
   said side walls of said dispensing unit being spaced apart to accommodate a pre-selected quantity of said laminar objects having similar dimensions and said lower walls and end walls of said dispensing unit being adjustable to position said laminar objects within said internal cavity such that a corner of each said laminar object extends outside said internal cavity into said display opening and the remainder of each said laminar object is inside the interior cavity;
   said dispensing slot dimensioned such that only a fraction of said pre-selected quantity of said laminar objects can pass through said dispensing slot at one time to be dispensed from said dispenser unit.

57. The point of sale device of claim 56, wherein said currency drawer further comprises a retaining mechanism for locking said dispenser units in said currency drawer.

58. The point of sale device of claim 57, wherein said retaining mechanism comprises a rod passing through a passage formed in each dispenser unit and fastening to a rear wall of said drawer.

59. The point of sale device of claim 1, wherein said hinge mechanism further comprises a friction damping unit which provides a force which opposes relative motion between said base unit and said cover unit.

60. The point of sale device of claim 59, wherein said hinge mechanism further comprises a torsion spring providing a bias between said base unit and said cover unit.

61. The point of sale device of claim 60, wherein said torsion spring provides an opening bias when said cover unit is in said closed configuration and provides a closing bias when said cover unit has been rotated more than approximately 130° from said closed configuration with respect to said base unit.

62. The point of sale device of claim 59, wherein said hinge mechanism further comprises a task light for illuminating the area adjacent to the front surface of the base unit.

63. The point of sale device of claim 62, wherein said task light has an adjustable light aperture to vary the amount of illumination provided.

64. The point of sale device of claim 62, wherein said task light has an adjustable light aperture to vary the direction of illumination provided.

65. The point of sale device of claim 64, wherein said adjustable light aperture varies the amount of illumination provided.

66. The point of sale device of claim 65, wherein said light aperture is adjusted by rotating a cylindrical light housing having a fixed aperture with respect to a fixed light shield.

67. The point of sale device of claim 1, further comprising a recessed transaction staging compartment formed in said cover unit adjacent said display screen.

68. The point of sale device of claim 67, further comprising a retaining clip projecting from the lower surface of said transaction staging compartment and being biased to press against the upper surface of said transaction staging compartment.

69. A point of sale device comprising:
- a cover unit having a display screen being mounted on one side thereof, a printer unit being mounted on an opposite side thereof, a control unit being located therein and controlling said display screen, said printer unit, and various operational states of said device, and a touch screen input unit being mounted over said display screen for supplying input signals to said control unit;
- a base unit having a front surface and being connected to said cover unit by a hinge mechanism interposed between said cover unit and said base unit such that said cover unit can be moved between a closed configuration, in which said cover unit is positioned with said display screen facing, and directly in front of, said front surface of said base unit such that said screen is not visible and access to said front surface of said base unit is blocked by said cover unit, and an open configuration, in which said cover unit is positioned to allow access to said front surface of said base unit and said display screen is visible;
- a card reader mounted in the front surface of said base unit and operatively connected to said control unit, said card reader being capable of reading magnetic stripes on credit cards and debit cards and also capable of interacting with smart cards containing electronic memory devices;
- a receivables drawer slidably mounted in said front surface of said base unit and movable between an open position and a closed position, said receivables drawer comprising at least one compartment for storage of transaction receivables;
- a currency drawer slidably mounted in said front surface of said base unit and movable between an open position and a closed position, said currency drawer comprising a plurality of dispenser units for storing and manually dispensing currency of various denominations and other laminar objects;
- an optical bar code scanner operatively connected to said control unit, said scanner being capable of reading printed bar codes;
- a latch mechanism for locking each of said receivables drawer and said currency drawer in said closed position when each said drawer is moved into said closed position, and for unlocking said drawer upon signal from said control unit;
- a locking mechanism for locking said cover unit in said closed configuration;
- wherein said device can be powered entirely by internal batteries and said device can also be powered by external electric power supplied through a connector port located on an outside surface of said device.

70. The point of sale device of claim 69, wherein said display screen is a backlighted liquid crystal display type having at least about 640 pixels in one direction and at least about 480 pixels in the other direction.

71. The point of sale device of claim 69, wherein said printer unit is a thermal printer.

72. The point of sale device of claim 69, wherein said control unit comprises a personal computer compatible with the IBM-PC standard and having a processor unit with a clock speed of at least about 100 megahertz, at least about 16 megabytes of processor associated random access memory, a primary mass storage device having at least about 500 megabytes of memory capacity, a backup mass storage device having at least about 4 megabytes of memory capacity, and control circuitry.

73. The point of sale device of claim 72, further comprising network communication circuitry connected to said computer and to a connector port located on an outside surface of said device, said network communication circuitry allowing communication between said computer and a computer external to said device.

74. The point of sale device of claim 73, wherein said network communication circuitry is compatible with the 10baseT ethernet standard.

75. The point of sale device of claim 73, wherein said network communication circuity is compatible with the 100baseT ethernet standard.

76. The point of sale device of claim 69, wherein said receivables drawer comprises:
- a first compartment having a one-way lid allowing manual insertion of laminar objects but prohibiting manual withdrawal of said objects, a second compartment having a partial lid for allowing manual insertion and manual withdrawal of transaction-related objects, and a third compartment for storing and manually dispensing coins and other small objects.

77. The point of sale device of claim 69, wherein each said dispensing unit of said currency drawer comprises:
- upper, lower, end and side walls defining an internal cavity having upper, lower, end and side surfaces, a display opening formed at an upper corner of said dispensing unit, and a dispensing slot formed through said upper wall of said dispensing unit and joining said internal cavity and said dispensing slot, said side walls of said dispensing unit being spaced apart to accommodate a pre-selected quantity of said laminar objects having similar dimensions and said lower walls and end walls of said dispensing unit being adjustable to position said laminar objects within said internal cavity such that a corner of each said laminar object extends outside said internal cavity into said display opening and the remainder of each said laminar object is inside the interior cavity, said dispensing slot dimensioned such that only a fraction of said preselected quantity of said laminar objects can pass through said dispensing slot at one time to be dispensed from said dispenser unit.

78. The point of sale device of claim 69, wherein said optical bar code scanner comprises:
- a hand-held scanner unit removably mounted in a compartment on said front side of said base unit, said hand-held unit being removable from said compartment for use, and having an electrical cable operably connected between said hand-held unit and said base unit.

79. The point of sale device of claim 69, wherein said latch mechanism includes for each said drawer a latch member, a coil/torsion spring, and a solenoid controlled by the control unit, each said latch pivoting about a first axis against the torsional bias of said coil/torsion spring to sequentially ride over and then engage a striker connected to said drawer when said drawer is moved into said closed position, thereby locking said drawer in said closed position, and each said latch pivoting about a second axis approximately perpendicular to said first axis and against the axial bias of said coil/torsion spring to disengage said striker when said solenoid is activated, thereby unlocking said drawer and allowing it to move into the open position.

80. The point of sale device of claim 69, wherein said locking mechanism comprises a pawl pivotally mounted in one of said base unit and said cover unit and a catch member mounted in another of said base unit and said cover unit, said pawl engaging said catch member to lock said cover unit in said closed configuration.

81. The point of sale device of claim 80, wherein said locking mechanism further comprises a solenoid and connecting linkage connected to said pawl, said solenoid and connecting linkage pivoting said pawl to disengage said catch member when said solenoid is activated, thereby allowing said cover unit to move from said closed configuration.

82. The point of sale device of claim 81, wherein
said connecting linkage further comprises a pivot plate and latch link;
said pivot plate being connected to said solenoid and pivotable about a pivot pin;
said latch link being connected between a point on said pivot plate and said pawl such that activating said solenoid causes said pivot plate to pivot in a first direction which causes said pawl to move in a direction moving said pawl from an engaged position to a disengaged position with respect to said catch member but applying a force to said pawl in a direction from said engaged position toward said disengaged position urges said pivot plate to pivot in the opposite direction such that the pivot plate encounters a stop member and said pawl remain engages with said catch member.

83. The point of sale device of claim 82, wherein said locking mechanism is activated by a push-button combination lock.

84. The point of sale device of claim 69, wherein said hinge mechanism further comprises a friction damping unit which provides a force which opposes relative motion between said base unit and said cover unit.

85. The point of sale device of claim 69, wherein said hinge mechanism further comprises a torsion spring providing a bias between said base unit and said cover unit.

86. The point of sale device of claim 85, wherein said torsion spring provides an opening bias when said cover unit is in said closed configuration and provides a closing bias when said cover unit has been rotated more than about 130° from said closed configuration.

87. The point of sale device of claim 69, wherein said hinge mechanism further comprises a task light.

88. The point of sale device of claim 87, wherein said task light has an adjustable light aperture to vary the amount and the direction of illumination provided.

89. The point of sale device of claim 88, wherein said light aperture is adjusted by rotating a cylindrical light housing having a fixed aperture with respect to a fixed light shield.

90. The point of sale device of claim 69, further comprising a transaction staging compartment formed in said cover unit adjacent said display screen.

91. The point of sale device of claim 90, further comprising a retaining clip projecting from the lower surface of said transaction staging compartment and being biased to press against the upper surface of said transaction staging compartment.

92. The point of sale device of claim 69, further comprising a cover sensor unit operably connected to said control unit, said cover sensor unit being capable of detecting whether said cover unit is in said closed configuration and providing a corresponding signal to said control unit.

* * * * *